2,813,852
Patented Nov. 19, 1957

2,813,852

DISAZO AND POLYAZO DYESTUFFS

Philippe Grandjean, Fritz Kehrer, Lukas Schneider, Willy Steinemann, and Markus Kappeler, Basel, Switzerland, assignors, by mesne assignments, to Saul & Co., Newark, N. J., as nominee of Fidelity Union Trust Company, executive trustee under Sandoz Trust No Drawing. Application April 11, 1955,
Serial No. 500,668

Claims priority, application Switzerland January 17, 1952

7 Claims. (Cl. 260—144)

The present invention relates to new disazo and polyazo dyestuffs and to the preparation thereof.

The disazo and polyazo dyestuffs of this invention are suitable for dyeing cotton and fibers of regenerated cellulose according to the single bath or aftermetallization processes or in the form of metal complex compounds. The resultant dyeings are distinguished by outstanding fastness to light and good fastness to wet treatments (fastness to washing, fastness to water, etc.).

The said disazo and polyazo dyestuffs correspond to the formula

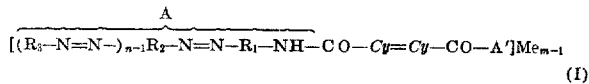

(I)

wherein $R_1$ is a mononuclear or binuclear radical of the benzene series or a radical of the naphthalene, pyrazolone or N-acetoacetylaminoaryl series with the exception of the radical

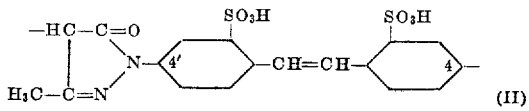

(II)

each of $R_2$ and $R_3$ is a mononuclear or binuclear radical of the benzene series or a radical of the naphthalene, pyrazolone or N-acetoacetylaminoaryl series, and $R_3$ may carry a radical connected thereto through an azo group, Me stands for Ni or Cu, one $y$ is hydrogen, Cl, Br or methyl while the other $y$ is hydrogen, $m$ is one of the integers 1, 2, 3, 4, and 5, $n$ is one of the integers 1 and 2, $A'$ is a radical of the composition A or the radical of an amnioazo compound of any other composition, with the exception of radicals which contain the grouping II connected to the dicarboxylic acid radical by a —NH— bridge in para-position to —CH=CH—, and A contains at least one grouping of the formula

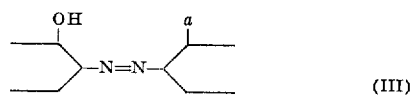

(III)

wherein $a$ stands for —OH, —COOH, —OCH₃ or —OCH₂—COOH. In addition, the said dyestuffs contain the requisite number of solubilizing groups to render them water-soluble, contain a maximum of six azo bridges, and may contain one or more —CH=CH—, —NH—, —NH.CO—, —CO.NH— and/or —NH.CO.NH-groupings in addition to the bridges already present between $Cy$ and $R_1$ and between $Cy$ and $A'$.

According to the preferred method of preparing the said disazo and polyazo dyestuffs, 2 mols of an aminoazo compound of the formula

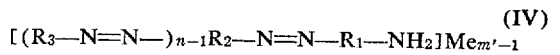

(IV)

wherein $R_1$, $R_2$, $R_3$, Me and $n$ have the afore-indicated significances, and $m'$ is one of the integers 1, 2 or 3, and which contains at least one grouping III which may be metallized, or 2 mols of a mixture of two such aminoazo compounds in any desired proportion, or 2 mols of a mixture, in any desired proportion, of one such aminoazo compound and an aminoazo compound of any other composition with the exception of those which have an end-positioned radical II with an amino group in the 4-position, are condensed with 1 mol of a dicarboxylic acid halide of the formula

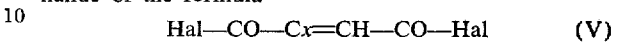

wherein Hal is Cl or Br, and $x$ is hydrogen, Cl, Br or methyl, preferably in aqueous medium and in the presence of an acid-binding agent.

In accordance with this first process embodiment, the aminoazo compounds of Formula IV are connected together with the aid of unsaturated dicarboxylic acid halides of Formula V. Such halides are for example the dichlorides and dibromides of fumaric acid, maleic acid, methyl-fumaric acid, methyl-maleic acid, chlorofumaric acid, bromofumaric acid, etc. In order to compensate for possible losses due to hydrolysis, the dicarboxylic acid halides are used in slight excess. To carry out the process, the aminoazo compounds IV are dissolved in water, whereupon the dicarboxylic acid halide is added, preferably at low temperature, from about 0° C. to about 30° C. The mixture is stirred vigorously, care being taken continuously to neutralize the liberated hydrogen halide, by the addition of an acid-binding agent such for example as sodium bicarbonate, sodium carbonate, sodium hydroxide, the corresponding lithium or potassium compounds, alkaline earth metal oxides or carbonates, magnesium oxide, or a suitable tertiary organic amine. The dicarboxylic acid halide may be diluted by an inert solvent, such as benzene, methyl-benzene, chlorobenzene, carbon tetrachloride or chloroform. The condensation is completed when no more free amino group can be detected. The reaction product will in part already be precipitated, and the rest can be separated from the reaction solution by salting out or, in some cases, by acidification, after which the reaction product is filtered off and, if necessary, washed and dried.

A homogeneous symmetrical dyestuff is obtained when 2 mols of the same aminoazo compound IV are connected together with the aid of 1 mol of dicarboxylic acid halide V. On the other hand, if the condensation is carried out with 2 mols of a mixture of 2 different aminoazo compounds, there is obtained a mixture of symmetrical and asymmetrical dicarboxylic acid derivatives. The mixture contains as integrating constituent a compound of the formula

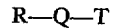

wherein R represents the radical of one and T represents the radical of the other aminoazo compound acylated in the amino group, and Q represents the radical of the dicarboxylic acid from which the dicarboxylic acid halide V is derived. The mixture also comprises the two symmetrical products of the formulae

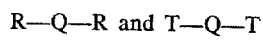

The 2 aminoazo compounds, which are different from each other, can be connected together in the proportion of 1:1 with the aid of a dicarboxylic acid halide V. However, similar valuable dyestuffs can be obtained with other mixture proportions, as for example by preparing the condensation products from 1 mol of dicarboxylic acid halide V and 2 mols of a mixture of two aminoazo compounds in the proportion of 4:1, 3:1, 2:1, 1:2, 1:3 or 1:4. In fact, some of the products thus obtained are superior in their properties to those obtained by condensing 1 mol of dicarboxylic acid halide V with 2 mols of aminoazo compounds in the 1:1 proportion. The present invention thus encompasses such mixtures and the preparation thereof.

A second process embodiment of the present invention involves, quite generally, the building up of disazo and polyazo dyestuffs of Formula I by the action of 1 mol of a dicarboxylic acid halide of the aforesaid Formula V on (a) 2 mols of an aromatic amine or of an aromatic aminoazo compound containing one or several mononuclear or binuclear radicals of the benzene series or one or several radicals of the naphthalene series or a radical of the pyrazolone or N-acetoacetylaminoaryl series and at least one group capable of azo dyestuff formation or a substituent convertible into such a group, or on (b) 2 mols of a mixture of two such amines or aminoazo compounds, with the exception of amines and aminoazo compounds derived from radical II and in which the amino group is in the 4-position, then coupling the thus-obtained condensation product with an appropriate diazo compound or diazotizing the condensation product and coupling it with an appropriate azo component, if necessary after conversion of the substituent or substituents convertible into a group or groups capable of azo dyestuff formation.

One special form of the aforesaid second process embodiment according to the present invention is carried out, for example, by diazotizing or tetrazotizing a monoamine or diamine of the formula $$H_2N-R_4-NH-CO-Cy=$$
$$Cy-CO-NH-R_4-z \quad (VI)$$

wherein the y's have the aforeindicated significance, the $R_4$'s represent identical or different mononuclear or binuclear radicals of the benzene series or radicals of the naphthalene series, and z stands for $-NH_2$, $-NO_2$ or a readily saponifiable acylamino group, and then coupling the product with an azo component of the benzene, naphthalene, pyrazolone or N-acetoacetylaminoaryl series which may bear additional substituents including radicals connected via an azo group or diazotizable amino groups, then if desired carrying out further coupling reactions with the thus-obtained azo compounds, converting z—in those cases where it is a nitro group or a readily saponifiable acylamino group—into the amino group by reduction or saponification before or after the last mentioned further coupling reactions, whereupon the resultant aminoazo compounds may be further diazotized and coupled with azo components of the indicated type, after which additional coupling reactions can be carried out.

According to this form of procedure, it is thus also possible to couple for example diamines of Formula VI, where z is $NH_2$, with azo components of the benzene, diphenyl, stilbene, naphthalene, pyrazolone or N-acetoacetylaminoaryl series, in which case the couplings may be carried out simultaneously or in different orders of succession. The azo components may be substituted in any desired manner and may for example also contain radicals connected thereto via an azo group. If the azo components contain diazotizable amino groups, the resultant aminoazo dyestuffs may thereupon be diazotized and again coupled with coupling components of the indicated type. According to definition, the substituent z of Formula VI may be other than an $NH_2$ group. In such event, z is converted into the amino group at any convenient stage of the preparation of the disazo or polyazo dyestuff. Illustrative of z substituents, other than $NH_2$, are primarily $NO_2$ and NH-acyl, such for example as $NH-CO.COOH$, $NH-CO.OCH_3$, $NH-CO.OC_2H_5$, $NH-CO.OC_4H_9$, which are readily convertible into $NH_2$ by reduction or saponification.

The working up of the dyestuffs obtained in this manner takes place after the manner described in the first process embodiment, supra. Here again, valuable mixtures can be prepared if, for example, 1 mol of the tetrazo compound from the diamine VI, wherein z of course stands for $NH_2$, is coupled simultaneously with 2 mols of two different azo components.

The monoamines and diamines VI can be obtained in various ways. In the first place it is possible to condense 1 mol of a nitroamino compound of the formula $$O_2N-R_4-NH_2 \quad (a)$$

wherein $R_4$ has the previously-recited signaficance, and 1 mol of the same or a different nitroamino compound of the same general formula with 1 mol of a dicarboxylic acid halide of Formula V, and then to convert one or both nitro groups into amino by treatment with a reducing agent. Secondly, it is possible to use corresponding N-acylamino-amino compounds instead of the nitroamino compounds, and to saponify one or both N-acylamino groups to amino. Finally, there is also the possibility to combine—with the aid of 1 mol of a dicarboxylic acid halide V—1 mol of a diamine of the formula $$H_2N-R_4-NH_2 \quad (b)$$

wherein $R_4$ has the afore-indicated significance, and in which one amino group is less reactive than the other for any reason, as for example because of steric influence or hindrance due to substituents on the nucleus $R_4$, with either 1 mol of a nitroamino compound of Formula a or with 1 mol of a corresponding N-acylamino-amino compound to yield a homogeneous monoamine VI or again with a further mol of a diamine of Formula b to yield a homogeneous diamine VI.

According to another special form of the aforesaid second process embodiment, dyestuffs of Formula I can also be obtained by coupling 1 mol of a dihydroxy compound of the formula $$R_5-NH-CO-Cx=CH-CO-NH-R_5 \quad (VII)$$

wherein x has the afore-indicated significance, and the two $R_5$'s represent identical or different radicals, containing a carbon atom capable of coupling, of the hydroxybenzene, hydroxynaphthalene, pyrazolone or N-acetoacetylaminoaryl series with the exception of radical II, with 2 mols of the diazo compound of an amine of the formula $$[(R_3-N=N-)_{n-1}R_2-NH_2]Me_{m''-1} \quad (VIII)$$

wherein $R_2$, $R_3$, Me and n have the afore-indicated significances, $m''$ is one of the integers 1 and 2, and wherein at least one grouping III, which may be metallized, is present and/or $R_2$ has in ortho-position to $NH_2$ a substituent which is capable of metal complex formation, or simultaneously or in any order of succession with 2 mols of the diazo compounds from two different amines of type VIII or from one such amine and one amine of any other desired constitution.

The coupling of the diazo compounds from the amines of Formula VIII with the dihydroxy compounds of Formula VII can be carried out—depending upon the coupling energy of the diazo compounds employed—in weak acid, neutral or alkaline aqueous medium at temperatures of 0–60°, and may be carried out in the presence of an agent favoring the coupling, such as pyridine, quinoline or another tertiary base. The reaction product is worked in the same manner as heretofore described. Here also, it is possible to prepare valuable dyestuff mixtures.

The preparation of the dihydroxy compound VII is advantageously carried out by condensing 2 mols of a compound of the formula $$R_5-NH_2 \quad (c)$$

wherein $R_5$ has the afore-indicated significance, in aqueous medium and in the presence of an acid-binding agent, with 1 mol of a dicarboxylic acid halide V, in the same manner as aforedescribed for the preparation of the new dyestuffs according to the first process embodiment, supra.

Finally, it is also possible to follow a procedure which combines the two precedingly-mentioned special forms of the second process embodiment of the invention. This procedure involves subjecting 1 mol of a monohydroxy compound of the formula $$z-R_4-NH-CO-Cy=Cy-CO-NH-R_5 \quad (IX)$$

wherein $R_4$, $R_5$, $y$ and $z$ have the afore-indicated significances, on one hand to coupling with 1 mol of a diazotized amine of Formula VIII, and on the other hand to diazotization—if necessary after conversion of the nitro group or the readily saponifiable acylamino group into $NH_2$—and then to coupling with 1 mol of an azo component of the benzene, naphthalene, pyrazolone or N-acetoacetylaminoaryl series which may contain any desired substituents including azo radicals or diazotizable amino groups, followed by subjecting the thus-obtained azo compound to further coupling reactions. The procedure then entails following what has precedingly been set forth in connection with the aforesaid special forms of the second process embodiment.

In all of the described process embodiments, the components involved in building up the new dyestuffs must be such, according to the invention, that the end products contain the number of solubilizing groups necessary to assure water-solubility.

The dyestuffs of the present invention are metallizable. Metallization thereof may be achieved either in substance or on the fiber. Particularly valuable metal complex compounds are obtained when metallization is carried out with nickel or copper yielding agents. The coppering, for example, of the new dyestuffs in substance can be carried out in per se conventional manner. Where the group to be metallized is an alkoxy group, the coppering may advantageously be carried out under such conditions that a dealkylating splitting of the alkoxy group takes place. This can be effected according to various ways, for example by heating with a copper salt in weak acid to weak alkaline medium and, if necessary, with the use of pressure and/or in the presence of amonia or organic bases, or in a melt of alkali metal salts of low molecular aliphatic monocarboxylic acids. The nickel complex compounds can be prepared in similar manner. Coppering of the dyestuffs on the fiber can be effected according to the single bath and aftercoppering methods conventionally employed in the dyeing art. The properties of the dyeings made with the unmetallized dyestuffs, as well as some of those made with the metal complex compounds, can be improved as regards fastness, by an aftertreatment, carried out in the presence of salts of bivalent copper, with polymeric substances containing imino or amino groups, such as are obtainable according to Patent No. 2,622,075 of December 16, 1952.

The precedingly described valuable mixtures can, in similar composition also be prepared by admixing together homogeneous individual symmetrical disazo and/or polyazo dyestuffs of the invention, whereby it is possible in many cases to obtain mixtures which are equally as good as the mixtures obtained, as hereinbefore set forth, during the production of the dystuffs.

The following examples illustrate the invention, without however being limitative thereof. In the said examples, the parts are by weight, the percentages are by weight, and the temperatures are set forth in degrees centigrade.

*Example 1*

53.5 parts of aminodisazo dyestuff—obtained by coupling diazotized 2-amino-5-nitrobenzene-1-carboxylic acid with 1 - phenyl - 3 - methyl-5-pyrazolone-4'-sulfonic acid, followed by reduction of the nitro group to the amino group, diazotization of the resultant aminomonoazo compound, and coupling with 1-amino-3-methylbenzene—are dissolved in water at room temperature with the addition of sodium hydroxide. Into the resultant solution, there is added dropwise and while stirring thoroughly a mixture of 7.7 parts of fumaric acid dichloride and 8 parts of benzene and, simultaneously, a sufficient amount of aqueous sodium carbonate solution to keep the reaction weakly alkaline throughout. After all the fumaric acid dichloride has been added, the condensation solution is further stirred until no more free $NH_2$ can be detected. The formed tetrakisazo dyestuff is then precipitated, while warming, with the aid of sodium chloride, and the precipitated product is filtered off and dried. It is a brown powder which dyes cotton and fibers of regenerated cellulose in red-orange shades, the fastness properties of which can be improved by aftertreatment with copper-yielding means.

Dyestuffs of similar properties are obtained when, while otherwise proceeding as described in the foregoing paragraph, the 1-amino-3-methylbenzene is replaced by an equivalent amount of another couplable amine of the benzene series such, for example, as 1-amino-2,5-dimethylbenzene or 1-amino-3-acetylaminobenzene.

Likewise, similar dyestuffs—somewhat yellower—are obtained when in the preparation of the starting aminodisazo dyestuff the 1-phenyl-3-methyl-5-pyrazolone-4'-sulfonic acid is replaced by 1-methoxy-2-acetoacetyl-aminobenzene-4-sulfonic acid or 2-acetoacetylaminonaphthalene-6,8-disulfonic acid.

*Example 2*

65.4 parts of aminodisazo dyestuff—prepared by coupling diazotized 2-amino-5-(4'-nitro)-benzoylaminobenzene-1-carboxylic acid with 1-phenyl-3-methyl-5-pyrazolone-4'-sulfonic acid, followed by reduction of the nitro group to the amino group, diazotization of the resultant aminomonoazo compound, and coupling with 1-amino-3 - methylbenzene—are dissolved neutral in water with addition of sodium hydroxide, and then condensed after the manner described in Example 1 with 7.7 parts of fumaric acid dichloride. The isolated and dried tetrakisazo dyestuff corresponds to the formula

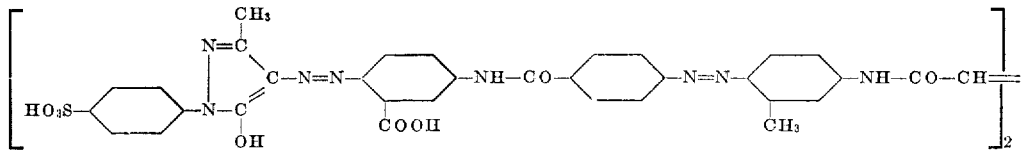

and is a yellow-brown powder which dyes cotton and fibers of regenerated cellulose in yellow shades, the fastness properties of which can be improved by aftertreatment with copper-yielding means.

Dyestuffs with similar properties are obtained when, in preparing the starting aminodisazo dyestuff, the 2-amino-5-(4'-nitro)-benzoylaminobenzene - 1 - carboxylic acid is replaced by 2-amino-5-(3'-nitro)-benzoylaminobenzene - 1 - carboxylic acid, 2-amino-5-(4'-methoxy-3'-nitro)-benzoylaminobenzene-1-carboxylic acid or by 2-amino - 5 - (3'-methyl-4'-nitro)-benzoylaminobenzene-1-carboxylic acid and/or, on the other hand, the 1-amino-3-methylbenzene is replaced by one of the amines of the benzene series enumerated in the second paragraph of Example 1.

*Example 3*

45.3 parts of the aminoazo compound, obtained by coupling diazotized 1-methoxy-2-amino-5-acetylaminobenzene-4-sulfonic acid with 2-hydroxynaphthalene-6-sulfonic acid, followed by saponification of the acetylamino group to the amino group, are dissolved in water at room temperature with the addition of sodium hydroxide, and then condensed after the manner described in Example 1 with 7.7 parts of fumaric acid dichloride. The isolated and dried disazo dyestuff is a dark powder which dyes cotton and fibers of regenerated cellulose in vivid bordeaux-red shades. The fastness properties of the dyeings, and particularly the fastness to light, can be improved by aftertreatment with copper yielding means, the shade being somewhat bluer.

The copper complex of the dyestuff of the preceding paragraph can be prepared in substance, for example by extended boiling of the aqueous dyestuff solution with copper sulfate and ammonia or by treating the dyestuff with copper sulfate in a sodium acetate melt. The copper complex compound corresponds to the formula

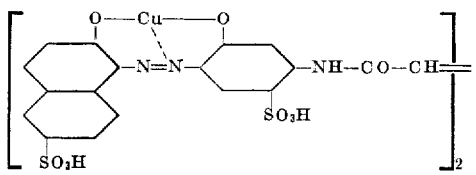

and dyes cotton and fibers of regenreated cellulose in reddish violet shades which are of very good fastness to light.

The copper complex compound can also be prepared by condensing the aminoazo compound, used as starting material, in the form of its copper complex, with the fumaric acid dichloride.

*Example 4*

31.7 parts (0.05 mol) of the aminoazo compound, obtained by coupling diazotized 2-aminobenzene-1-carboxylic acid with 2-[4'-(4''-amino)-phenyl]-phenylamino - 5 - hydroxynaphthalene-7,3''-disulfonic acid and 12.9 parts (0.05 mol) of 4-hydroxy-4'-amino-1,1'-azobenzene-3-carboxylic acid, are dissolved in water with the addition of sodium hydroxide, and then condensed with 7.7 parts (0.05 mol) of fumaric acid dichloride after the manner described in Example 1. The dyestuff mixture thus obtained, and the asymmetrical constituent of which corresponds to the formula

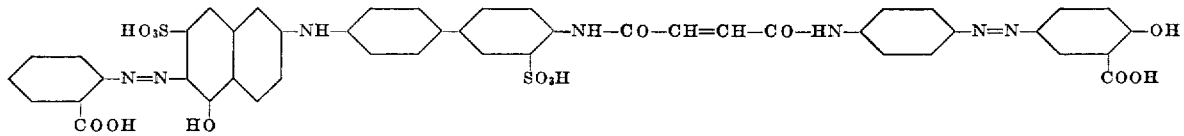

is in the isolated state a brown powder which dyes cotton and fibers of regenerated cellulose in reddish brown shades. By aftertreatment with a copper-yielding agent, the shade becomes deeper and the wet fastness properties are improved.

Dyestuffs with similar properties are obtained when, in preparing the first one of the aforementioned aminoazo compounds, the 2-aminobenzene-1-carboxylic acid is replaced by 1-carboxy-2-aminobenzene-4- or -5-sulfonic acid or by 1-hydroxy-2-aminobenzene-4-sulfonic acid or by 1-hydroxy-2-aminobenzene-4-sulfonic acid amide or by 1-hydroxy-2-amino-6-chlorobenzene-4-sulfonic acid or by 1-hydroxy-2-amino-4-methylsulfonylbenzene.

Similarly valuable dyestuffs are obtained when, while otherwise proceeding as described in the first paragraph of the present example, the second-mentioned aminoazo compound is replaced by an equivalent amount of an aminoazo dyestuff prepared by coupling diazotized 1-hydroxy-2-(4'-amino) - benzoylamino-6-carboxybenzene-4-sulfonic acid with 1-amino-3-methylbenzene or by coupling diazotized 1-carboxy - 2 - aminobenzene-5-sulfonic acid with 1-(4'-amino)-phenyl-3-methyl-5-pyrazolone or by coupling diazotized 2-aminobenzene-1-carboxylic acid or diazotized 1-carboxy-2-aminobenzene-5-sulfonic acid with 2-[4'-(4''-amino)-phenyl] - phenylamino-5-hydroxynaphthalene-7,3''-disulfonic acid.

*Example 5*

26.8 parts (0.05 mol) of aminodisazo compound—obtained by coupling diazotized 2-amino-5-nitrobenzene-1-carboxylic acid with 1-phenyl-3-methyl-5-pyrazolone-4'-sulfonic acid, followed by reduction of the nitro group to the amino group, diazotization of the resultant aminomonoazo compound, and coupling with 1-amino-3-methylbenzene—and 19.7 parts (0.05 mol) of aminoazo compound—obtained by coupling diazotized 1-amino-3-carboxy-4-hydroxybenzene-5-sulfonic acid with 1-amino-3-acetylaminobenzene—are together dissolved in water with the addition of sodium hydroxide and are then condensed with 7.7 parts (0.05 mol) of fumaric acid dichloride after the manner described in Example 1. The resultant dyestuff mixture is, after isolation, a yellow-brown powder which dyes cotton and fibers of regenerated cellulose in light-fast orange shades, aftertreatment of the resultant dyeings with a copper-yielding agent bringing about an improvement in fastness to wet treatments.

Dyestuffs with similar properties are obtained when, in the preparation of the first one of the named aminoazo compounds, the 1-amino-3-methylbenzene is replaced by one of the amines of the benzene series enumerated in paragraph 2 of Example 1 and/or, in the preparation of the second of the said aminoazo compounds, the 1-amino-3-acetylaminobenzene is also replaced by such an amine.

Similarly valuable dyestuffs are obtained when, while otherwise proceeding as described in the first paragraph of the present example, the second of the enumerated components of the starting mixture is replaced by an equivalent amount of an aminoazo compound obtainable by coupling diazotized 1-carboxy-2-aminobenzene-5-sulfonic acid with 1-(4'-amino)-phenyl-3-methyl-5-pyrazolone or by coupling diazotized 1-hydroxy-2-(4'-amino)-benzoylamino-6-carboxybenzene-4-sulfonic acid with 1-amino-3-methylbenzene.

*Example 6*

19.7 parts (0.05 mol) of the aminoazo compound prepared by coupling diazotized 1-amino-3-carboxy-4-hydroxybenzene-5-sulfonic acid with 1-amino-3-acetylaminobenzene, and 20.8 parts (0.05 mol) of the aminoazo compound prepared by coupling diazotized 1-carboxy-2-aminobenzene-5-sulfonic acid with 1-(4'-amino)-phenyl-3-methyl-5-pyrazolone are together dissolved in water with the addition of sodium hydroxide, and then condensed with 7.7 parts (0.05 mol) of fumaric acid dichloride after the manner set forth in Example 1. The resulting dyestuff is a mixture of three condensation products which correspond to the formulae

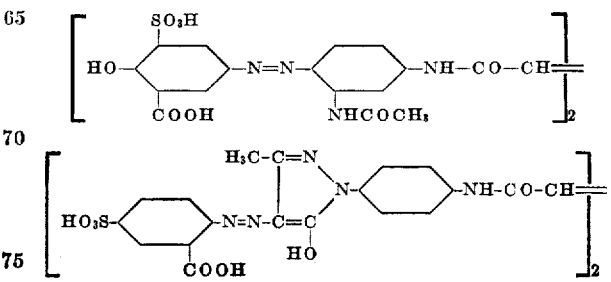

and 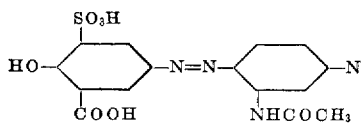 is, in the isolated state, a dark powder which dyes cotton 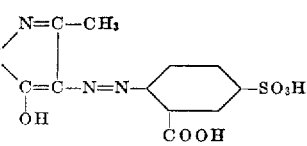

and is, after isolation, a yellow-brown powder which dyes cotton and fibers of regenerated cellulose in light-fast yellow shades, the fastness of which to wet treatments is improved by after-treatment with a copper-yielding agent.

Dyestuffs with similar properties are also obtained when, in the foregoing, (a) the 1-amino-3-acetylaminobenzene used in preparing the first-named aminoazo compound is replaced by 1-amino-3-methylbenzene or 1-amino - 2,5 - dimethylbenzene or 1 - amino - 2 - methoxy-5-methylbenzene and/or (b) the second aminoazo compound is replaced by an equivalent amount of an aminoazo dyestuff obtainable by coupling diazotized 1-carboxy-2-aminobenzene-5-sulfonic acid with 1-amino-4-acetoacetylaminobenzene or by coupling diazotized 1-hydroxy-2 - amino - 6 - chlorobenzene - 4 - sulfonic acid with 1 - (4' - amino) - phenyl - 3 - methyl - 5 - pyrazolone.

Example 7

22.7 parts (0.05 mol) of the aminoazo compound used as starting material in Example 3 and 21.2 parts (0.05 mol) of the aminoazo compound prepared by coupling diazotized 1-hydroxy-2-amino-6-chlorobenzene-4-sulfonic acid with 1-(4'-amino)-phenyl-3-methyl-5-pyrazolone are together dissolved in water with the addition of sodium hydroxide, and then condensed with 7.7 parts (0.05 mol) of fumaric acid dichloride according to the procedure set forth in Example 1. The resultant dyestuff mixture is, after isolation, a dark powder which dyes cotton and fibers of regenerated cellulose in brown shades, the fastness of which to wet treatments is enhanced by aftertreatment with a copper-yielding agent.

The copper complex compound of the dyestuff, prepared in substance, dyes cotton and fibers of regenerated cellulose in light-fast brown shades.

Dyestuffs with similar properties are obtained when, in the preparation of the second one of the aminoazo compounds mentioned in the first paragraph of the present example, the 1-hydroxy-2-amino-6-chlorobenzene-4-sulfonic acid is replaced by 1-hydroxy-2-aminobenzene-4-sulfonic acid or by 1-carboxy-2-aminobenzene-5-sulfonic acid or by 1-hydroxy-2-aminobenzene-4-sulfonic acid amide or by 1-hydroxy-2-amino-4-butylsulfonylbenzene.

Example 8

33.3 parts (0.033 mol) of the copper complex compound of the aminodisazo compound obtained by coupling 1 mol of tetrazotized 4,4'-diamino-3,3'-dimethoxy-1,1'-diphenyl on the one hand with 1 mol of 1-amino-8-hydroxynaphthalene-3,6-disulfonic acid and on the other hand with 1 mol of 1,8-dihydroxynaphthalene-3,6-disulfonic acid, and 17.2 parts (0.067 mol) of 4-hydroxy-4'-amino-1,1'-azobenzene-3-carboxylic acid are together dissolved in water with the addition of sodium hydroxide, and then condensed with 7.7 parts (0.05 mol) of fumaric acid dichloride. The resultant dyestuff mixture, the asymmetrical constituent of which corresponds to the formula and fibers of regenerated cellulose in vivid green shades. By aftertreatment with a copper-yielding agent, fastness to wet treatments and the fastness to light of the dyeings are enhanced.

If the two aminoazo compounds are condensed with the fumaric acid dichloride in another mol proportion than the 1:2 proportion set forth in the preceding paragraph—for example, if the mol proportion is 2:1 or 1:1 or 1:3—somewhat bluer or more yellowish green dyestuffs are obtained, the properties of which are equally as good as those of the product of the said paragraph.

Dyestuffs with similar properties are also obtained when, on the one hand, in the preparation of the first of the aforementioned aminoazo compounds the 1,8-dihydroxynaphthalene-3,6-disulfonic acid is replaced by a hydroxynaphthalene-mono-, -di- or -tri-sulfonic acid such for example as 1-hydroxynaphthalene-4-sulfonic acid, 2-hydroxynaphthalene-4- or -6-sulfonic acid, 2-hydroxynaphthalene-6,8-disulfonic acid, or 1-hydroxynaphthalene-3,6,8-tri-sulfonic acid, and/or the 1-amino-8-hydroxynaphthalene-3,6-disulfonic acid is replaced by 1-amino-8-hydroxynaphthalene-4-sulfonic acid or by 2-amino-5-hydroxynaphthalene-7-sulfonic acid or by 2-amino-8-hydroxynaphthalene-6-sulfonic acid, and/or when, on the other hand, the second of the aforementioned aminoazo compounds is replaced by 4-hydroxy-3-carboxy-4'-amino-2'-acetylamino-1,1'-azobenzene-5-sulfonic acid or by an aminoazo dyestuff obtained by coupling diazotized 2-aminonaphthalene-6,8-disulfonic acid with 1-amino-3-acetylaminobenzene or by coupling diazotized 1-carboxy-2 - aminobenzene - 5-sulfonic acid with 1-(4'-amino)-phenyl-3-methyl-5-pyrazolone or by coupling diazotized 1 - hydroxy - 2 - (4'-amino)-benzoylamino-6-carboxybenzene-4-sulfonic acid with 1-amino-3-methylbenzene or by coupling diazotized 1-carboxy-2-aminobenzene-5-sulfonic acid with 1-amino-4-acetoacetylaminobenzene.

Example 9

19.2 parts of the diamine, obtained by the condensation of 2 mols of 2-nitro-5-aminobenzene-1-carboxylic acid with 1 mol of fumaric acid dichloride, followed by reduction of the nitro group to the amino group, are dissolved in water with the addition of sodium hydroxide, after which 6.9 parts of sodium nitrite are added to the solution. The latter is then slowly introduced into a mixture of 40 parts of 30% hydrochloric acid and 100 parts of ice in such manner that the end temperature of the mixture is 5–10°. Upon completion of the tetrazotization, the suspension of the precipitated tetrazo compound is run, in the course of 30 minutes, into an alkaline solution of 25.4 parts of 1-phenyl-3-methyl-5-pyrazolone-4'-sulfonic acid. The reaction mass is maintained alkaline throughout by the addition of sodium carbonate in small portions. Coupling takes place rapidly. After about 2 hours, the solution containing the produced disazo dyestuff is heated to 70°, the dyestuff salted out therefrom, filtered off and dried. It is an orange-yellow powder which dissolves with yellowish coloration in concentrated

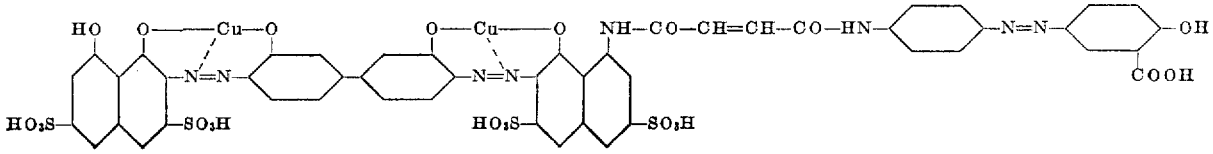

sulfuric acid and in water. Its coppered dyeings on cellulosic fibers are yellowish orange; the copper complex compound prepared in substance also produces yellowish orange dyeings. The dyeings possess excellent fastness to light and good fastness to wet treatments.

*Example 10*

44.7 parts of the aminoazo compound obtained by coupling diazotized 2-amino-5-nitrobenzene-1-carboxylic acid with 1 - phenyl - 3-methyl-5-pyrazolone-4'-sulfonic acid, followed by reduction of the nitro group to the amino group, are dissolved in the form of the disodium salt in 1500 parts of water. 5 parts of lithium carbonate are then added to the solution, followed—at a uniform rate in the course of 2½ to 3 hours at a temperature of 5–8° and while stirring thoroughly—by a 10% solution of fumaric acid dichloride in chlorobenzene until free NH2 can no longer be detected. The resultant disazo dyestuff corresponds to the formula

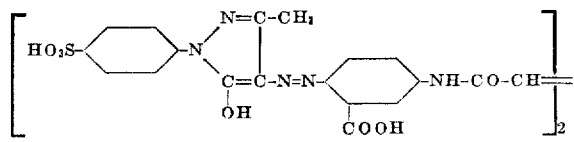

and is isolated after the manner of the preceding examples. Dried and ground, it is an orange-yellow powder which is identical with the dyestuff described in Example 9.

Similar very valuable dyestuffs are obtained if the 1-phenyl-3-methyl-5-pyrazolone-4'-sulfonic acid of the preceding paragraph is replaced by 1-phenyl-3-methyl-5-pyrazolone-3'-sulfonic acid or by 1-phenyl-3-methyl-5-pyrazolone-3'-sulfonic acid amide or by 1-(4'-methylsulfonyl)-phenyl-3-methyl-5-pyrazolone.

*Example 11*

40.6 parts of the aminoazo compound obtained by coupling diazotized 1-carboxy-2-aminobenzene-5-sulfonic acid amide with 1-(4'-amino)-phenyl-3-methyl-5-pyrazolone are dissolved in about 3000 parts of water. While stirring vigorously, a 20% solution of fumaric acid dichloride in 1,2-dichlorobenzene is added dropwise at about 5° and in the course of 4–5 hours, until the starting dyestuff is completely acylated. The resultant disazo dyestuff is salted out at elevated temperature, and is then filtered off, washed and dried. It is an orange powder which dissolves with yellow coloration in concentrated sulfuric acid and in water, and dyes cotton and fibers of regenerated cellulose in pure yellow shades. The dyeings are characterized by excellent fastness to light and to wet treatments, particularly if they are treated with copper-yielding agents.

*Example 12*

41.7 parts of the aminoazo dyestuff obtained by coupling diazotized 1-carboxy-2-aminobenzene-5-sulfonic acid with 1-(4'-amino)-phenyl-3-methyl-5-pyrazolone are dissolved in 2500 parts of water with the aid of the requisite amount of sodium carbonate. Then, while stirring thoroughly, a 10% solution of symmetrical maleic acid dichloride in chlorobenzene is added dropwise in the course of 4 to 5 hours until no more free NH2 is detactable. The resultant dyestuff, isolated as in the preceding examples, is dried and ground. It is an orange-brown powder which dissolves with yellow coloration in concentrated sulfuric acid and in water. Its dyeings on cotton and fibers of regenerated cellulose, which are also yellow, possess excellent fastness to light and to wet treatments, particularly if they are treated with copper-yielding agents.

If, instead of the symmetrical maleic acid dichloride used in the preceding paragraph, the process is carried out with chlorofumaric acid dichloride or methylfumaric acid dichloride or fumaric acid dichloride, or fumaric acid dibromide, very similar dyestuffs with equally good properties are obtained.

By replacing the starting dyestuff of the present example by an equivalent quantity of the isomeric aminoazo dyestuff obtained by coupling diazotized 1-carboxy-2-aminobenzene-4-sulfonic acid with 1 - (4' - amino) - phenyl-3-methyl-5-pyrazolone, and otherwise proceeding according to the first paragraph of this example, a product is obtained which dyes cotton in somewhat more greenish, but equally fast shades.

The substantive copper complex compound of the condensation product obtained from 20.9 parts of the starting dyestuff of the present example and 20.8 parts of the isomeric compound mentioned in paragraph 3 of this example with maleic acid dichloride, and which corresponds to the formula

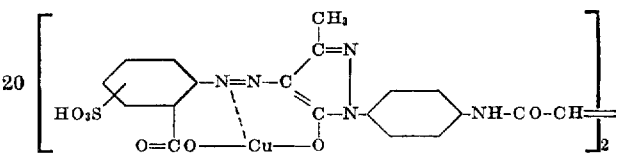

also dyes cotton and fibers of regenerated cellulose in very fast shades. The copper complex compound is obtained either by coppering the condensation product from the uncoppered starting compounds or by condensation of the copper complex compounds of the starting dyestuffs.

*Example 13*

21 parts (0.05 mol) of the aminoazo compound prepared by coupling diazotized 1-carboxy-2-aminobenzene-5-sulfonic acid with 1 - (4' - amino) - phenyl-3-methyl-5-pyrazolone, and 17 parts (0.05 mol) of the aminoazo compound obtained from diazotized 2-aminobenzene-1-carboxylic acid and 1 - (4' - amino)-phenyl-3-methyl-5-pyrazolone, are dissolved in 3500 parts of water with addition of lithium carbonate. To the solution which has an alkaline reaction, there is added dropwise, at 8–10° and with thorough stirring, a 20% solution of fumaric acid dichloride in benzene, until free NH2 is no longer detectable. The resultant disazo dyestuff mixture is isolated, dried and ground, whereupon it is obtained as an orange-brown powder which dissolves with yellow coloration in concentrated sulfuric acid, and which dyes cotton and fibers of regenerated cellulose in pure yellow shades. The thus-obtained dyeings are of outstanding fastness to light and to wet treatments, especially if they are treated with copper-yielding agents.

Very similar disazo dyestuff mixtures of excellent properties are obtained when the 17 parts of the second aminoazo compound mentioned in the preceding paragraph are replaced by 21 parts of the aminoazo compound obtainable by coupling diazotized 1-carboxy-2-aminobenzene-4-sulfonic acid with 1 - (4' - amino) - phenyl-3-methyl-5-pyrazolone or by the corresponding quantity of the aminoazo compound which can be prepared by coupling diazotized 2-amino-5-nitrobenzene-1-carboxylic acid with 1-methoxy-2-acetoacetylaminobenzene-4- or -5-sulfonic acid or with 2-acetoacetylaminobenzene-1-carboxylic acid or with 1 - acetoacetylamino-4-hydroxybenzene-3-carboxylic acid or with 3-methyl-5-pyrazolone, in each case followed by reduction of the nitro group to the amino group.

A similarly valuable disazo dyestuff mixture is obtained when, instead of condensing 0.05 mol of the first aminoazo compound with 0.05 mol of the second aminoazo compound, 0.02 mol of the first aminoazo compound is condensed with 0.08 mol of the second aminoazo compound.

*Example 14*

26.8 parts (0.05 mol) of the aminoazo compound obtained by coupling diazotized 1-carboxy-2-aminobenzene-5 - sulfonic acid - (2'-carboxy)-phenylamide with 1-(4'-amino) - phenyl - 3-methyl-5-pyrazolone, and 19.2 parts (0.05 mol) of the aminoazo compound obtained by coupling diazotized 2-amino-5-nitrobenzene-1-carboxylic acid with 2-acetoacetylaminobenzene-1-carboxylic acid followed by reduction of the nitro group to the amino group, are together dissolved in 2500 parts of water with addition of sodium carbonate. After the resultant alkaline-reacting solution has been cooled with ice to 5°, a 10% solution of fumaric acid dichloride in methylbenzene is added dropwise, in the course of 2–3 hours and with thorough stirring, until no more free NH₂ can be detected. The resultant disazo dyestuff mixture is then isolated. Dried and ground, it is an orange-red powder which dissolves with yellow coloration in water and in concentrated sulfuric acid. It dyes cotton and fibers of regenerated cellulose in yellow shades which are of excellent fastness to light and to wet treatments, especially if they are treated with copper-yielding agents.

Valuable disazo dyestuff mixtures are also obtained when, instead of 0.05 mol of the first aminoazo compound, use is made of 0.02 or 0.04 mol thereof, and correspondingly, instead of 0.05 mol of the second aminoazo compound, use is made of 0.08 or 0.06 mol thereof.

A very similar yellow dyestuff mixture of even better fastness properties is obtained when, while otherwise proceeding as set forth in the first paragraph in this example, the 19.2 parts of the second aminoazo compound are replaced by 20.9 parts of the aminoazo compound obtained by coupling 1-carboxy-2-aminobenzene-5-sulfonic acid with 1-(4'-amino)-phenyl-3-methyl-5-pyrazolone.

By coppering in substance the dyestuff mixtures obtainable according to the present example, products are obtained which dye cotton and fibers of regenerated cellulose in yellow shades of excellent fastness to light and wet treatments.

*Example 15*

47 parts (0.1 mol) of the aminoazo compound obtained by the acid coupling of diazotized 1-(4'-amino)-benzoylamino - 2 - hydroxy - 3 - carboxybenzene - 5 - sulfonic acid with 1-amino-3-methylbenzene, and 41.7 parts (0.1 mol) of the aminoazo compound obtained by coupling diazotized 1-carboxy-2-aminobenzene-5-sulfonic acid with 1-(4'-amino)-phenyl-3-methyl-5-pyrazolone are dissolved in 3000 parts of water with an excess of sodium bicarbonate. The solution, after having been cooled to about 5° by the addition of crushed ice, is uniformly admixed in the course of 3 hours with a 20% fumaric acid dibromide solution in chlorobenzene, which latter solution is added until free NH₂ is no longer detectable. During this procedure, the condensation mass is maintained alkaline throughout by the dropwise addition of an aqueous sodium bicarbonate solution. The resultant disazo dyestuff mixture is isolated by salting out with sodium chloride and filtering. Dried and ground, it is a yellow-brown powder which dissolves with orange-red coloration in concentrated sulfuric acid and with yellow coloration in water, and which dyes cotton and fibers of regenerated cellulose in pure yellow shades which are fast to light and to wet treatments, especially after treatment with copper-yielding agents.

Similar, somewhat greener dyestuffs are obtained when, on the one hand, the diazo component used in preparing the first aminoazo compound of the example is replaced by 1-(3'- or -4' amino)-benzoylamino-3-carboxy-4-hydroxybenzene-5-sulfonic acid or by 1-(3'-amino)-benzoylamino - 2 - hydroxy - 3 - carboxy - 5 - sulfonic acid or by 1-(4'-amino-3'-methyl)-benzoylamino-3-carboxy-4-hydroxybenzene-5-sulfonic acid and/or the azo component is replaced by 1-amino-3-acetylaminobenzene or by 1-amino-2-methoxy-5-methylbenzene and/or, on the other hand, the second aminoazo compound is replaced by the compound obtained by coupling 1-carboxy-2-aminobenzene-5-sulfonic acid with 1-carbethoxyamino-4-acetoacetylaminobenzene, followed by saponification of the carbethoxyamino group to the amino group.

*Example 16*

38.7 parts (0.1 mol) of the aminoazo compound obtained by the alkaline coupling of 13.7 parts of diazotized 2-aminobenzene-1-carboxylic acid with 23.9 parts of 2-amino-5-hydroxynaphthalene-7-sulfonic acid, and 25.7 parts (0.1 mol) of 4-hydroxy-4'-amino-1,1'-azobenzene-3-carboxylic acid are dissolved in 3000 parts of water with the addition of sodium carbonate, after which a mixture of 18 parts (0.12 mol) of fumaric acid dichloride and 30 parts of chlorobenzene is added in the course of about 2 hours and at a temperature of 5–10°. The reaction solution is kept weakly alkaline by the portionwise addition of 20 parts of sodium bicarbonate. The resultant disazo dyestuff, which is a mixture of the condensation products which correspond to the formulae

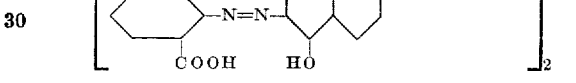
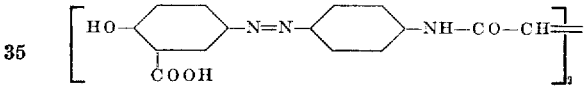

and

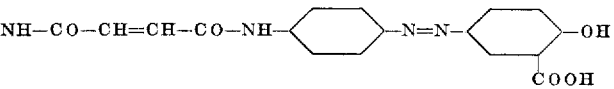

is salted out of the solution, filtered off and dried. It is a red powder which dissolves with red coloration in concentrated sulfuric acid and with orange coloration in water, and which dyes cotton and fibers of regenerated cellulose, by the single bath or aftercoppering process, in yellow-brown shades of good fastness to light and to washing.

Dyestuffs of similar properties are obtained when the 4 - hydroxy - 4' - amino - 1,1' - azobenzene - 3 - carboxylic acid is replaced by 4-hydroxy-5-methyl-4'-amino-1,1'-azobenzene-3-carboxylic acid or by 4-hydroxy-2-methyl - 4' - amino - 1,1' - azobenzene - 3 - carboxylic acid or by 4-hydroxy-5-chloro-4'-amino-1,1'-azobenzene-3-carboxylic acid.

A similarly valuable dyestuff is obtained when, instead of the 4-hydroxy-4'-amino-1,1'-azobenzene-3-carboxylic acid, use is made of the aminoazo compound obtained by coupling diazotized 2-amino-5-nitrobenzene-1-carboxylic acid with 1-phenyl-3-methyl-5-pyrazolone-4'-sulfonic acid, followed by reduction of the nitro group to the amino group.

*Example 17*

24.2 parts (0.05 mol) of the aminoazo compound obtained by coupling 28.4 parts of diazotized 1-amino-2-hydroxy 6-nitronaphthalene-4-sulfonic acid with 18.9 parts of 1-(4'-amino)-phenyl-3-methyl-5-pyrazolone, and 63.5 parts (0.15 mol) of the aminoazo compound obtained by coupling 22.3 parts of diazotized 1-hydroxy-2-amino-6- chlorobenzene-4-sulfonic acid with 18.9 parts of 1-(4'-amino)-phenyl-3-methyl-5-pyrazolone are dissolved in 3000 parts of water with the addition of sodium carbonate, after which a solution of 27 parts (0.11 mol) of fumaric acid dibromide in 30 parts of chlorobenzene is added in the course of 2 hours and at a temperature of 5–10°. The reaction solution is maintained weakly alkaline throughout by the portionwise addition of 20 parts of sodium bicarbonate. The resultant disazo dyestuff is salted out of the solution, filtered off and dried. It is a black powder, the asymmetrical constituent of which corresponds to the formula of 1-amino-3-methoxybenzene or by 32.3 parts of the aminoazo compound obtained by the acid coupling of 18.9 parts of diazotized 1-hydroxy-2-aminobenzene-4-sulfonic acid with 12.3 parts of 1-amino-3-methoxybenzene.

*Example 19*

24.4 parts of 4,4'-diamino-3,3'-di-ethoxy-1,1'-diphenyl are tetrazotized and coupled at 0°, in a medium made alkaline with sodium carbonate, with 30.4 parts of 1-hydroxynaphthalene-3,8-disulfonic acid in solution in water. The resultant diazoazo compound is filtered off and then further coupled, after the addition of pyridine, with an

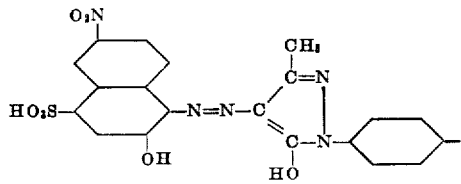 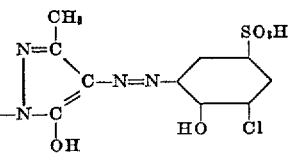

and which dissolves with orange coloration in concentrated sulfuric acid and with red coloration in water, and dyes cotton and fibers of regenerated cellulose by the single bath or aftercoppering process in brown-red shades of good fastness to light and to washing.

Dyestuffs with similar properties are obtained when, in preparing the first aminoazo compound of this example, the 1-amino-2-hydroxy-6-nitronaphthalene-4-sulfonic acid is replaced by 1-hydroxy-2-amino-6-chlorobenzene-4-sulaqueous solution of the couper complex compound of the intermediate prepared by coupling 22.3 parts of diazotized 1-hydroxy-2-amino-6-chlorobenzene-4-sulfonic acid with 55.8 parts of fumaric acid-di-[5-hydroxy-7-sulfonaphthyl-(2)]-amide.

The resultant dyestuff is salted out of the solution with sodium chloride, is filtered off and is then subjected to conventional de-ethylating coppering. The cupriferous dyestuff corresponds to the formula

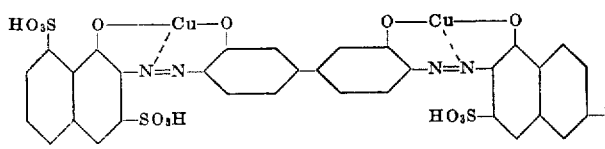

fonic acid or when, in preparing the second aminoazo compound, the 1-hydroxy-2-amino-6-chlorobenzene-4-sulfonic acid is replaced by 1-amino-2-hydroxy-6-nitronaphthalene-4-sulfonic acid.

*Example 18*

The copper complex compound from 47.3 parts (0.1 mol) of the aminoazo dyestuff prepared by alkaline coupling of 22.3 parts of diazotized 1-hydroxy-2-amino-6-chlorobenzene-4-sulfonic acid with 23.9 parts of 2-amino-5-hydroxynaphthalene-7-sulfonic acid, and the copper complex compound from 36.7 parts (0.1 mol) of the aminoazo dyestuff obtained by the acid coupling of 22.3 parts of diazotized 1-hydroxy-2-amino-6-chlorobenzene-4-sulfonic acid with 12.3 parts of 1-amino-3-methoxybenzene are dissolved in 3000 parts of water with the addition of sodium carbonate, after which a solution of 17 parts (0.11 mol) of fumaric acid dichloride in 30 parts of chlorobenzene is added in about 2 hours and at a temperature of 5 to 10°. The reaction solution is maintained weakly alkaline by the portionwise addition of 20 parts of sodium bicarbonate. The resultant disazo dyestuff is salted out of the solution and filtered off.

In order to prepare the copper-free dyestuff with the ortho-ortho'-dihydroxyazo grouping, the moist filter cake is stirred for about 2 hours at a temperature of 25–30° with 900 parts of 10% hydrochloric acid, followed by filtration, conversion into the sodium salt, and drying. The dyestuff is a black powder which dissolves with Bordeaux-red coloration in concentrated sulfuric acid and in water, and dyes cotton and fibers of regenerated cellulose by the single bath or aftercoppering process in red shades of very good fastness to light and to washing.

Dyestuffs of similar properties are obtained when while otherwise proceeding as aforedescribed in this example the 47.3 parts of the first aminoazo compound are replaced either by 36.7 parts of the aminoazo compound obtained by the acid coupling of 22.3 parts of diazotized 1-hydroxy-2-amino-6-chlorobenzene-4-sulfonic acid with 12.3 parts and dyes cotton and fibers of regenerated cellulose in blue shades of very good fastness to light and to washing. By aftertreatment on the fiber with a copper salt, the fastness to wet treatments is further enhanced.

*Example 20*

84.8 parts of 2-hydroxy-3,5'-dicarboxy-4'-amino-1,1'-diphenylurea-5-sulfonic acid are diazotized and gradually added to a solution of 55.8 parts of fumaric acid-di-[5-hydroxy-7-sulfonaphthyl-(2)]-amide in 1500 parts of water, 500 parts of pyridine and 100 parts of 25% aqueous ammonia. After about 12 hours, the coupling is completed and the resultant disazo dyestuff is salted out, filtered and dried. It dyes cotton and fibers of regenerated cellulose by the aftercoppering process in Bordeaux-red shades of very good fastness to light and of good fastness to washing.

For conversion into the copper complex compound, 140 parts of the dystuff are dissolved in 3000 parts of water at 80–85°, and 60 parts of crystalline sodium acetate and 70 parts of concentrated acetic acid are added to the solution. Then a solution of 50 parts of crystalline copper sulfate in 200 parts of water is run in gradually, after which the temperature is maintained at 80–85° for another hour. The resultant copper complex compound is precipitated as the sodium salt, and is filtered off and dried. It is a dark powder which dyes cotton and fibers of regenerated cellulose in Bordeaux-red shades of very good fastness to light and good fastness to washing. By aftertreatment on the fiber with copper salts, the wet treatment fastness properties are further enhanced.

*Example 21*

1096 parts of the aminoazo compound obtained by the acid coupling of 800 parts of diazotized 4-nitro-4'-aminostilbene-2,2'-disulfonic acid with 274 parts of 1-methoxy-2-amino-4-methylbenzene are diazotized and then coupled with a solution, rendered alkaline with sodium carbonate, of 558 parts of fumaric acid di-[5-hydroxy-7- sulfonaphthyl - (2) ] - amide. The resultant dyestuff is salted out and filtered off.

For conversion into the copper complex compound, the procedure described in Example 20 is followed. The copper complex compound dyes cotton and fibers of regenerated cellulose in gray shades of good fastness to light and to washing. By after-treatment on the fiber with a copper salt, a further improvement in fastness to wet treatments is realized.

*Example 22*

76.3 parts of the aminofumaryl intermediate obtained by the condensation of 0.095 mol of 2-amino-5-hydroxynaphthalene-7-sulfonic acid and 0.105 mol of 4-nitro-4'-aminostilbene-2,2'-disulfonic acid with 0.105 mol of fumaric acid dichloride, followed by reduction of the nitro group to the amino group, are dissolved in 300 parts of water with the addition of sodium carbonate, after which coupling is effected with 22.3 parts of diazotized 1-hydroxy-2-amino-6-chlorobenzene-4-sulfonic acid in a solution rendered alkaline with sodium carbonate, monoazo dyestuff formation taking place. The thus-obtained dyestuff is salted out and filtered off.

For diazotization, 101 parts of the obtained aminoazo product are dissolved in 300 parts of water, 7 parts of sodium nitrite added to the solution, and the latter then adjusted to acidity with 70 parts of 30% hydrochloric acid at 10–15°, while stirring thoroughly. Thereupon the resultant suspension of diazoazo compound is added gradually to a solution of 17.4 parts of 1-phenyl-3-methyl-5-pyrazolone, containing sodium hydroxide. The thus-produced dyestuff is precipitated by salting out, filtered off, redissolved in water, and again precipitated, filtered off and dried. It is a dark powder which dies cotton and fibers of regenerated cellulose by the aftercoppering process in red shades of very good fastness to light and good fastness to washing.

A dyestuff with similar properties is obtained when use is made of 13.8 parts of 1-hydroxy-2-carboxybenzene in lieu of the 17.4 parts of 1-phenyl-3-methyl-5-pyrazolone in the present example.

The aminofumaryl intermediate product of the present example is advantageously prepared by dissolving 22.7 parts (0.095 mol) of 2-amino-5-hydroxynaphthalene-7-sulfonic acid and 42 parts (0.105 mol) of 4-nitro-4'-aminostilbene-2,2'-disulfonic acid in 800 parts of water with the addition of sodium carbonate. Into the resultant solution, there are added simultaneously and dropwise, at 5° and while stirring thoroughly, on the one hand 16 parts (0.105 mol) of fumaric acid dichloride and on the other hand a sufficient quantity of aqueous sodium carbonate solution to keep the reaction of the solution weakly alkaline throughout. After all the fumaric acid dichloride has been added, stirring of the condensation mass is continued until no more free NH₂ is detectable. The mass is then heated to 90°, the condensation product salted out therefrom and filtered off at 40°. For purification, it is stirred into 1500 parts of water with the addition of 20 parts of sodium carbonate at 95°, after which difficultly soluble matter is removed by filtration. Upon cooling, the condensation product separates in crystalline form from the solution. It is filtered off, and the nitro group reduced to the amino group by the Béchamp method. If desired, the reduction can be carried out after coupling of the nitrofumaryl intermediate with the diazotized 1-hydroxy-2-amino-6-chlorobenzene-4-sulfonic acid.

If, in the foregoing, the nitrofumaryl intermediate obtained by the condensation of 0.095 mol of 2-amino-5-hydroxynaphthalene-7-sulfonic acid and 0.105 mol of 4-nitro-4'-aminostilbene-2,2'-disulfonic acid with 0.105 mol of fumaric acid dichloride is replaced by the carbethoxyaminofumaryl intermediate obtained by the condensation of 0.095 mol of 2-amino-5-hydroxynaphthalene-7-sulfonic acid and 0.105 mol of 4-carbethoxyamino-4'-aminostilbene-2,2'-disulfonic acid with 0.105 mol of fumaric acid dichloride, followed by saponification of the carbethoxyamino group to the amino group immediately or after the coupling of the intermediate to the diazotized 1-hydroxy-2-amino-6-chlorobenzene-4-sulfonic acid, and if otherwise the procedure set forth in the second paragraph of the present example is followed, a dyestuff is obtained which is identical with the product described in the said paragraph.

*Example 23*

30.1 parts of the aminoazo compound obtained by coupling diazotized 1-amino-4 - hydroxybenzene - 3 - carboxylic acid with 1-amino-2-methoxy-5-methylbenzene are dissolved in water with the addition of sodium hydroxide. 6.9 parts of sodium nitrite are then added to the solution, which is thereupon slowly added to a mixture of 30 parts of 30% hydrochloric acid and 100 parts of ice in such manner that the end temperature of the mixture is 5–10°. Upon completion of the diazotization, the diazo suspension is run in the course of 1 hour into a solution, in 500 parts of water and 250 parts of pyridine, of the tetrasodium salt of 35.9 parts of the dihydroxy compound obtained by the condensation of 2 mols of 1-amino-8 - hydroxynaphthalene-3,6 - disulfonic acid with 1 mol of fumaric acid dichloride. Upon completion of the coupling, the tetrakisazo dyestuff is precipitated by the addition of hydrochloric acid, and is then isolated. It is converted into the sodium salt by dissolution in dilute aqueous sodium hydroxide solution, then salted out of the solution, filtered off and dried. It is a dark powder which dissolves with blue coloration in water, and dyes cotton and fibers of regenerated cellulose in marine-blue shades which become greener and faster to light upon aftertreatment with a copper-yielding agent.

The complex copper compound of the dyestuff can also be prepared in substance, for example by prolonged boiling of the dyestuff solution with copper sulfate and ammonia, or by fusing the dyestuff with copper sulfate in a sodium acetate melt. The copper complex compound thus prepared dyes cotton and fibers of regenerated cellulose in greenish blue shades which are very fast to light.

Dyestuffs with similar properties are obtained when, in preparing the aforementioned aminoazo compound, the 1-amino-4-hydroxybenzene-3-carboxylic acid is replaced by 1-amino-3-carboxy-4-hydroxybenzene - 5 - sulfonic acid and/or the 1-amino-2-methoxy-5-methylbenzene is replaced by 1-amino-2-methoxybenzene or by 1-aminobenzene-2- carboxylic acid.

By reacting 2 mols of the diazo compound obtainable by the coupling, on one side, of tetrazotized 4,4'-diamino-3,3'-dimethoxy-1,1'-diphenyl with 2-hydroxynaphthalene-4-sulfonic acid, with 1 mol of the precedingly mentioned dihydroxy compound in the presence of aqueous pyridine, there is also obtained a blue tetrakisazo dyestuff, the copper complex compound of which corresponds to the formula

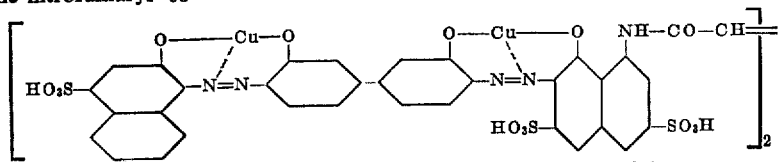

and yields dyeings which are very fast to light.

*Example 24*

223.5 parts of 1-hydroxy-2-amino-6-chlorobenzene-4- sulfonic acid are diazotized and then gradually added to a solution of 558 parts of symmetrical fumaric acid-di-[5-hydroxy-7-sulfonaphthyl-(2)]-amide and 260 parts of sodium carbonate in water. The coupling is complete in about 24 hours. 1500 parts of an aqueous 20% sodium carbonate solution are then added, after which further coupling with 137 parts of diazotized 2-amino-benzene-1-carboxylic acid is effected. The coupling is complete in 1 to 2 hours; the resultant disazo dyestuff is salted out and filtered off. It dyes cotton and fibers of regenerated cellulose by the aftercoppering process in Bordeaux-red shades of very good fastness to light and of good fastness to washing.

For conversion into the substantive copper complex compound, 940 parts of the dyestuff are dissolved at 80–85° in 15,000 parts of water, and then 600 parts of crystalline sodium acetate are added. Thereupon 2500 parts of a 20% aqueous copper sulfate solution are run in gradually, after which the temperature is maintained at 80–85° for two more hours. The solution is then adjusted to alkalinity with sodium carbonate, and the dyestuff salted out, filtered off and dried. It is a dark powder which dyes cotton and fibers of regenerated cellulose in Bordeaux-red shades of very good fastness to light and good fastness to washing. By aftertreatment on the fiber with a copper salt, the fastness to wet treatments is further improved.

Dyestuffs with similar properties are obtained if, while otherwise proceeding as precedingly described in this example, the 1-hydroxy-2-amino-6-chlorobenzene-4-sulfonic acid is replaced by the equivalent amount of 1-hydroxy-2-amino-4-chlorobenzene-6-sulfonic acid, 1 - hydroxy - 2 - amino - 6 - nitrobenzene-4-sulfonic acid, 1-hydroxy-2-amino-4-nitrobenzene-6-sulfonic acid, 1-hydroxy-2-amino-6-acetylaminobenzene-4-sulfonic acid, 1-hydroxy-2-amino-6-benzoylaminobenzene-4-sulfonic acid, 1-hydroxy-2-amino-6-carbethoxyaminobenzene-4-sulfonic acid, 1-hydroxy-2-aminobenzene-4-sulfonic acid, 1-hydroxy-2-amino-4-methylsulfonylbenzene, 1-hydroxy-2-aminobenzene-4-sulfonic acid-amide, 1-hydroxy-2-aminobenzene-4-sulfonic acid-methylamide, 1-hydroxy-2-amino-benzene-4-sulfonic acid-dimethylamide, 1-hydroxy-2-aminobenzene-4-sulfonic acid-phenylamide, 1-hydroxy-2-aminobenzene-4-sulfonic acid-(3'-methyl)-phenylamide, 1-hydroxy-2-aminobenzene-4-sulfonic acid-(3'-carboxy-4'-hydroxy)-phenylamide, 1-hydroxy-2-aminobenzene-4-sulfonic acid-(3'-carboxy-4'-hydroxy-5'-sulfo)-phenylamide, 1-hydroxy - 2 - amino - 6-chlorobenzene-4-sulfonic acid-amide, 1-hydroxy-2-amino-6-chlorobenzene-4-sulfonic acid-methylamide, 1-hydroxy-2-amino-6-chlorobenzene-4-sulfonic acid-dimethylamide, 1-hydroxy-2-amino - 6 - chlorobenzene - 4 - sulfonic acid-phenylamide or 2-aminobenzene-1-carboxylic acid.

*Example 25*

246 parts of 1-hydroxy-2-amino-6-chlorobenzene-4-sulfonic acid are diazotized and gradually added to a solution of 558 parts of symmetrical fumaric acid-di-[5-hydroxy-7-sulfonaphthyl-(2)]-amide and 280 parts of sodium carbonate in 12,000 parts of water. After about 24 hours, the coupling is complete; the reaction mass is then diluted with 33,000 parts of water, heated to 45–50°, and adjusted to acidity with a small quantity of acetic acid. Then 120 parts of crystalline sodium acetate are added, and coupling carried out at 45–50° with 217 parts of diazotized 1-carboxy-2-aminobenzene-5-sulfonic acid. The coupling is complete in 2 to 3 hours; the reaction mass is then made alkaline with sodium carbonate, and the produced disazo dyestuff salted out and filtered off. It dyes cotton and fibers of regenerated cellulose by the aftercoppering process in Bordeaux-red shades of very good fastness to light and fastness to washing.

Conversion into the substantive copper complex compound may be carried out in the manner described in Example 24. The coppered dyestuff dyes cotton and fibers of regenerated cellulose in Bordeaux-red shades of very good fastness to light and good fastness to washing. By aftertreatment on the fiber with a copper salt, an improvement in fastness to wet treatments is achieved.

Dyestuffs with similar properties are obtained when, while otherwise proceeding according to the present example, the 1-hydroxy-2-amino-6-chlorobenzene-4-sulfonic acid is replaced by an equivalent quantity of one of the ortho-hydroxyaminobenzene compounds enumerated in the last paragraph of Example 24, or when, in any of the resultant combinations, the 1-carboxy-2-aminobenzene-5-sulfonic acid is replaced by an equivalent amount of 1-carboxy-2-aminobenzene-4-sulfonic acid, 1-carboxy-2-aminobenzene-4-sulfonic acid-amide, 1-carboxy-2-aminobenzene-4-sulfonic acid-methylamide, 1-carboxy-2-aminobenzene-4 - sulfonic acid - dimethylamide, 1 - carboxy - 2 - aminobenzene-4-sulfonic acid-phenylamide, 1-carboxy-2-aminobenzene-4-sulfonic acid-(4'-methyl)-phenylamide, 1-carboxy-2-aminobenzene-4-sulfonic acid-(2'-carboxy)-phenylamide, 1-carboxy-2-aminobenzene-4-sulfonic acid-N-methyl-phenylamide, 1-carboxy-2-aminobenzene-5-sulfonic acid-amide, 1-carboxy-2-aminobenzene-5-sulfonic acid-methylamide, 1-carboxy-2-aminobenzene-5-sulfonic acid-dimethylamide, 1-carboxy-2-aminobenzene-5-sulfonic acid-phenylamide, 1-carboxy-2-aminobenzene-5-sulfonic acid-(4'-methyl)-phenylamide, 1 - carboxy - 2 - aminobenzene-5-sulfonic acid-(2'-carboxy)-phenylamide or 1-carboxy-2-aminobenzene-5-sulfonic acid-N - methyl - phenylamide.

*Example 26*

156 parts of 1-hydroxy-2-amino-6-chlorobenzene-4-sulfonic acid are diazotized together with 80 parts of 1-hydroxy-2-aminobenzene-4,6-disulfonic acid, and then gradually added to a solution of 558 parts of symmetrical fumaric acid-di-[5-hydroxy-7-sulfonaphthyl - (2)] - amide and 300 parts of sodium carbonate in 12,000 parts of water. The coupling is complete in about 24 hours. 1000 parts of a 20% aqueous sodium carbonate solution are then added to the reaction mass, after which the intermediate therein is further coupled, at 8–10°, with 137 parts of diazotized 2-aminobenzene-1-carboxylic acid. Upon completion of the coupling, the resultant mixture of disazo dyestuffs is salted out and filtered off.

For conversion into the copper complex compound, 948 parts of the thus-obtained dyestuff is dissolved at 80–85° in 15,000 parts of water, after which 600 parts of crystalline sodium acetate are added to the solution. 2500 parts of a 20% aqueous copper sulfate solution are then added gradually and the mass kept at 80–85° for two more hours. Thereupon the mass is rendered alkaline with sodium carbonate, and the produced dyestuff salted out, filtered off and dried. It is a dark powder which dyes cotton and fibers of regenerated cellulose in Bordeaux-red shades of very good fastness to light and good fastness to washing. By aftertreatment on the fiber with a copper salt, the fastness to wet treatments is further improved.

*Example 27*

30 parts of the cupriferous dyestuff obtained according to Example 25 (first two paragraphs) and 70 parts of the cupriferous dyestuff obtained according to Example 24 (first two paragraphs) are intimately admixed. The resultant dyestuff mixture dyes cotton and fibers of regenerated cellulose in Bordeaux-red shades of very good fastness to light and good fastness to washing. By aftertreatment on the fiber with a copper salt, the fastness to wet treatments is further improved.

*Example 28*

260 parts of 1-hydroxy-2-amino-6-chlorobenzene-4-sulfonic acid are diazotized and then gradually added to a solution of 558 parts of symmetrical fumaric acid-di-[5-hydroxy-7-sulfonaphthyl-(2)]-amide and 200 parts of sodium carbonate in 14,000 parts of water and 1200 parts of pyridine. After about 12 hours monoazo dyestuff formation has taken place. The monoazo dyestuff thus produced is then further coupled, after the addition of 180 parts of sodium carbonate, with 242 parts of diazotized 1-hydroxy-2-aminobenzene-4,6-disulfonic acid. The thus-produced disazo dyestuff is salted out, filtered off and dried.

Coppering in substance is carried out after the manner described in Example 24. The copper complex compound corresponds to the formula

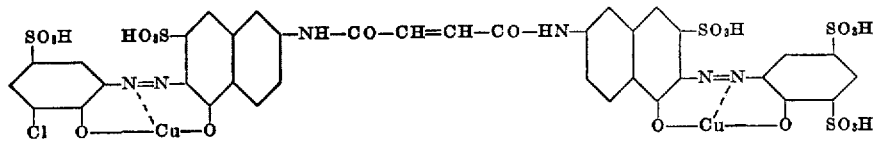

and dyes cotton and fibers of regenerated cellulose in Bordeaux-red shades of very good fastness to light and good fastness to washing. By after treatment on the fiber with a copper salt, a further improvement in fastness to wet treatments is achieved.

Dyestuffs with similar properties are also obtained when, while otherwise proceeding as precedingly described in this example, the 1-hydroxy-2-amino-6-chlorobenzene-4-sulfonic acid is replaced by an equivalent amount of one of the ortho-hydroxy-aminobenzene compounds enumerated in Example 24 or when, in any of the resultant combinations, the 1 - hydroxy - 2 - aminobenzene - 4,6 - disulfonic acid is replaced by 1-hydroxy-2-amino-6-chlorobenzene - 4 - sulfonic acid, 1 - hydroxy - 2 - amino - 4 - chlorobenzene - 6 - sulfonic acid, 1 - hydroxy - 2 - amino- 6 - nitrobenzene - 4 - sulfonic acid, 1 - hydroxy - 2 - amino- 4 - nitrobenzene - 6 - sulfonic acid, 1 - hydroxy - 2 - aminobenzene - 4 - sulfonic acid, 1 - hydroxy - 2 - amino - 6 - acetylaminobenzene - 4 - sulfonic acid, 1 - hydroxy - 2 - amino - 6 - benzoylaminobenzene - 4 - sulfonic acid or 1 - hydroxy - 2 - amino - 6 - carbethoxyaminobenzene - 4 - sulfonic acid.

*Example 29*

109 parts of 1-hydroxy-2-aminobenzene are diazotized and then added gradually to a solution of 558 parts of symmetrical fumaric acid-di-[5-hydroxy-7-sulfonaphthyl-(2)]-amide and 80 parts of sodium hydroxide in 14,000 parts of water and 1200 parts of pyridine. Upon completion of the coupling, the reaction mass is diluted with 20,000 parts of water, heated to 45–50°, and adjusted to an acid reaction by the addition of acetic acid. Then 120 parts of crystalline sodium acetate are added, and coupling carried out with 217 parts of diazotized 1-carboxy-2-aminobenzene-5-sulfonic acid. After 2 to 3 hours, the coupling is complete; the solution is then made alkaline with sodium carbonate, and the resultant dyestuff salted out and filtered off. It dyes cotton and fibers of regenerated cellulose by the aftercoppering process in Bordeaux-red shades of very good fastness to light and good fastness to washing.

Dyestuffs with similar properties are obtained when, while otherwise proceeding according to the foregoing paragraph, the 1-hydroxy-2-aminobenzene is replaced by an equivalent amount of 1-hydroxy-2-amino-4-nitrobenzene, 1 - hydroxy - 2 - amino - 5 - nitrobenzene, 1 - hydroxy - 2 - amino - 5 - chlorobenzene, 1 - hydroxy - 2 - amino - 4 - chloro - 5 - nitrobenzene, 1 - hydroxy - 2 - amino - 4 - nitro - 6 - chlorobenzene, 1 - hydroxy - 2 - amino - 4,6 - dichlorobenzene, 2 - amino - 5 - nitrobenzene - 1 - carboxylic acid, 1 - hydroxy - 2 - amino - 3,6 - dichlorobenzene - 4 - sulfonic acid, 2 - aminonaphthalene-3-carboxylic acid, 1-hydroxy-2-amino-4-methylbenzene, 1-hydroxy-2-amino-4-chlorobenzene or 1-hydroxy-2-amino-4-bromobenzene, or when, in any of the resultant combinations, the 1-carboxy-2-aminobenzene-5-sulfonic acid is replaced by the equivalent amount of 1-carboxy-2-aminobenzene-4-sulfonic acid.

*Example 30*

519 parts (1 mol) of the monoazo compound obtained by the alkaline coupling of 269 parts of diazotized 1-hydroxy-2-aminobenzene-4,6-disulfonic acid with 239 parts of 2 - amino - 5 - hydroxynaphthalene - 7 - sulfonic acid, and 534 parts (1 mol) of the monoazo compound obtained by the alkaline coupling of 239 parts of diazotized 1 - amino - 2 - hydroxynaphthalene - 4 - sulfonic acid with 239 parts of 2 - amino - 5 - hydroxynaphthalene - 7 - sulfonic acid are dissolved in 17,000 parts of water with the addition of sodium carbonate, after which a mixture of 184 parts (1.2 mols) of fumaric acid dichloride and 300 parts of chlorobenzene are added at room temperature (about 20–40°) in the course of about 2 hours. The reaction solution is maintained alkaline throughout by the portionwise addition of a total of 200 parts of sodium bicarbonate. The produced disazo dyestuff mixture is isolated and converted into the copper complex compound after the manner described in Example 24. The said copper complex compound dyes cotton and fibers of regenerated cellulose in Bordeaux-red shades of very good fastness to light and good fastness to washing. The fastness to wet treatments is further improved by aftertreatment on the fiber with a copper salt.

Dyestuffs with similar properties are obtained when, while otherwise proceeding as described in the foregoing paragraph, the 1 - hydroxy - 2 - aminobenzene - 4,6 - disulfonic acid is replaced by 1 - carboxy - 2 - aminobenzene - 4 - sulfonic acid or 1 - carboxy - 2 - aminobenzene- 5 - sulfonic acid, or when in any of the disclosed combinations of the present example, the 1-amino-2-hydroxynaphthalene-4-sulfonic acid is replaced by an equivalent amount of 1 - amino - 2 - hydroxy - 6 - nitronaphthalene-4-sulfonic acid.

Identical dyestuffs are obtained upon replacement of the aforementioned fumaric acid dichloride by the equivalent quantity of fumaric acid dibromide or of symmetrical maleic acid dichloride.

*Example 31*

475 parts (1 mol) of the monoazo compound obtained by the alkaline coupling of 223.5 parts of diazotized 1-hydroxy - 2 - amino - 6 - chlorobenzene - 5 - sulfonic acid with 239 parts of 2 - amino - 5 - hydroxynaphthalene - 7- sulfonic acid, and 489 parts (1 mol) of the monoazo compound obtained by the alkaline coupling of 239 parts of diazotized 1 - amino - 2 - hydroxynaphthalene - 4 - sulfonic acid with 239 parts of 2 - amino - 5 - hydroxynaphthalene - 7 - sulfonic acid are dissolved in 22,000 parts of water with the addition of sodium carbonate, after which 184 parts (1.2 mols) of fumaric acid dichloride and 300 parts of dichlorobenzene are added at room temperature (20–40°) in the course of about 2 hours. The reaction solution is kept weakly alkaline throughout by the portionwise addition of a total of about 200 parts of sodium bicarbonate. The resultant disazo dyestuff mixture is salted out, filtered off and dried. It dyes cotton and fibers of regenerated cellulose by the aftercoppering process in violet-red shades of very good fastness to light and good fastness to washing.

Dyestuffs with similar properties are obtained when, while otherwise proceeding according to the foregoing paragraph, the 1-hydroxy-2-amino-6-chlorobenzene-4-sulfonic acid is replaced by an equivalent quantity of any one of the ortho-hydroxy-aminobenzene compounds which can be used in lieu of the 1-hydroxy-2-amino-6-chlorobenzene-4-sulfonic acid in Example 24 or by an equivalent quantity of 1-amino-2-hydroxynaphthalene-4-sulfonic acid, 1-amino-2-hydroxy-6-nitronaphthalene-4-sulfonic acid, 2-aminobenzene-1-carboxylic acid, 1-carboxy-2-aminobenzene-4- or -5-sulfonic acid-amide, 1-carboxy-2-aminobenzene-4- or -5-sulfonic acid-methylamide, 1-carboxy-2-aminobenzene-4- or -5-sulfonic acid-dimethylamide, 1-carboxy-2-aminobenzene-4- or -5-sulfonic acid-phenylamide, 1-carboxy-2-aminobenzene-4- or -5-sulfonic acid-N-methyl-phenylamide, 1-carboxy-2-aminobenzene-4- or -5-sulfonic acid-(2'-carboxy)-phenylamide, 1-carboxy-2-aminobenzene-4- or -5-sulfonic acid-(3'-carboxy-4'-hydroxy)-phenylamide, 1-hydroxy-2-aminobenzene, 1-hydroxy-2-amino-4- or -5-nitrobenzene, 1-hydroxy-2-amino-4-chlorobenzene, 1-hydroxy-2-amino-4,6-dichlorobenzene, 1-hydroxy-2-amino-4-chloro-5- or -6-nitrobenzene or 1-hydroxy-2-amino-3,6-dichlorobenzene-4-sulfonic acid, or when the 1-amino-2-hydroxynaphthalene-4-sulfonic acid in any of the foregoing combinations of the present example is replaced by the equivalent amount of 1-amino-2-hydroxy-6-nitronaphthalene-4-sulfonic acid, 1-hydroxy-2-amino-4-chlorobenzene-6-sulfonic acid, 1-hydroxy-2-amino-4-nitrobenzene-6-sulfonic acid, 2-aminonaphthalene-3-carboxylic acid, 1-hydroxy-2-aminobenzene-4-sulfonic acid-ethylamide, 1-hydroxy-2-aminobenzene-4-sulfonic acid-dimethylamide, 1-hydroxy-2-aminobenzene-4-sulfonic acid-phenylamide, 1-hydroxy-2-aminobenzene, 1-hydroxy-2-amino-4- or -5-nitrobenzene, 1-hydroxy-2-amino-4-chlorobenzene, 1-hydroxy-2-amino-4-chloro-5- or -6-nitrobenzene, 1-hydroxy-2-amino-4,6-dichlorobenzene, 2-aminobenzene-1-carboxylic acid or 2-amino-5-nitrobenzene-1-carboxylic acid.

Example 32

203 parts of 1-methoxy-2-aminobenzene-4-sulfonic acid are diazotized and combined with a solution of 558 parts of symmetrical fumeric acid-di-[5-hydroxy-7-sulfonaphthyl-(2)]-amide and 420 parts of sodium bicarbonate in 14,000 parts of water. Upon completion of the coupling, the monoazo dyestuff is further coupled with 137 parts of diazotized 2-aminobenzene-1-carboxylic acid, with the addition of 300 parts of sodium carbonate. The thus-obtained disazo dyestuff is salted out and filtered off.

For conversion into the copper complex compound, 920 parts of the dyestuff are dissolved in 15,000 parts of water, after which there is gradually added to the resultant solution, at 85°, a mixture of 500 parts of crystalline copper sulfate, 800 parts of 25% aqueous ammonium hydroxide solution and 1500 parts of water. The metallization solution is maintained at 90–95° for 20 hours and, upon completion of the coppering, the dyestuff is isolated. It dyes cotton and fibers of regenerated cellulose in Bordeaux-red shades of very good fastness to light and good fastness to washing. The fastness to wet treatment is further improved by aftertreatment on the fiber.

The identical dyestuff is obtained when the 203 parts of 1-methoxy-2-aminobenzene-4-sulfonic acid are replaced by 189 parts of 1-hydroxy-2-aminobenzene-4-sulfonic acid.

Dyestuffs with similar properties are obtained when, while otherwise proceeding as described in the first paragraph of this example, the 1-methoxy-2-aminobenzene-4-sulfonic acid is replaced by an equivalent amount of 1-methoxy-2-amino-6-nitrobenzene-4-sulfonic acid, 1-methoxy-2-amino-6-chlorobenzene-4-sulfonic acid or 1-amino-2-methoxy- or -ethoxynaphthalene-6-sulfonic acid, or when the 2-aminobenzene-1-carboxylic acid in any of the foregoing combinations is replaced by an equivalent quantity of 1-carboxy-2-aminobenzene-4- or -5-sulfonic acid, 1-hydroxy-2-aminobenzene-4,6-disulfonic acid or 1-amino-2-methoxynaphthalene-6-sulfonic acid.

Example 33

50 parts of the disazo dyestuff obtained according to Example 12, first paragraph, are dissolved in the form of tetrasodium salt, in 2000 parts of water. 30 parts of crystalline sodium acetate are added to the solution, after which such quantity of a 10% aqueous nickel sulfate solution is added, in the course of 20–30 minutes and at about 70, until persistent excess nickel (II)-ions are detectable. The new nickel complex compound which corresponds to the formula

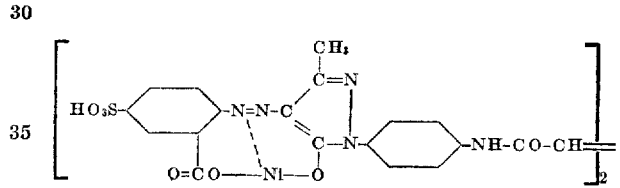

is thereupon salted out and collected on a filter. Dried, it is a yellow powder which dissolves with yellow coloration in concentrated sulfuric acid. Its dyeings on cotton and fibers of regenerated cellulose are yellow and possess very good fastness to light and to wet treatments.

Example 34

215 parts (1.5 mols) of 1-hydroxy-2-amino-4-chlorobenzene are diazotized and gradually added to a solution of 558 parts (1.0 mol) of fumaric acid-di-[5-hydroxy-7-sulfonaphthyl-(2)]-amide in 7000 parts of water, 2000 parts of crude pyridine and 1000 of 25% aqueous ammonia. When coupling is complete the resultant azo compound is isolated and then coupled with 75 parts (0.55 mol) of diazotized 2-aminobenzene-1-carboxylic acid. The disazo dyestuff thus obtained is salted out, filtered and dried. It is a black powder which dyes cotton and fibers of regenerated cellulose by the after-coppering process in Bordeaux-red shades of very good fastness to light and of good fastness to water.

A dyestuff with similar process is obtained when, in lieu of 1-hydroxy-2-amino-4-chlorobenzene, use is made of 1-hydroxy-2-aminobenzene, 1-hydroxy-2-amino-4- or -5-nitrobenzene, 1-hydroxy-2-amino-4-chloro-6-nitrobenzene, 1-hydroxy-2-amino-4-nitro-6-chlorobenzene or 1-hydroxy-2-amino-4,6-dichlorobenzene.

The following table sets forth additional azo dyestuffs which can be prepared according to one of the preceding examples. Column 1 indicates the example numbers; column 2 specifies the two mols of aminoazo compounds AA and AB which are joined together by one mol of fumaric acid dichloride; column 3 indicates the use of the respective azo dyestuffs; and column 4 enumerates the shade of the coppered dyeings on cotton.

| (1) Example No. | (2) Connected together with the aid of 1 Mol of Fumaric Acid Dichloride | | (3) Used in Dyeing as— | (4) Shade of Coppered Dyeing on Cotton |
|---|---|---|---|---|
| | Aminoazo Compound (AA) | Aminoazo Compound (AB) | | |
| 35 | 1 mol of (1-carbomethoxy-2-aminobenzene → 2-amino-5-hydroxynaphthalene-7-sulfonic acid). | 1 mol of copper complex compound from (1-hydroxy-2-aminobenzene-4,6-disulfonic acid → 2-amino-5-hydroxynaphthalene-7-sulfonic acid). | aftercoppering dyestuff or metal complex compound. | bordeaux-red. |
| 36 | 1 mol of (1-aminobenzene-2,5-disulfonic acid → 1-amino-2-methoxy-5-methylbenzene → 1-(4′-amino)-phenyl-3-methyl-5-pyrazolone). | same as (AA) | aftercoppering dyestuff | Do. |
| 37 | 0.7 mol of (1-hydroxy-2-amino-6-chlorobenzene-4-sulfonic acid → 2-(4′-amino)-benzoylamino-5-hydroxynaphthalene-7-sulfonic acid). | 1.3 mols of (1-amino-2-hydroxynaphthalene-4-sulfonic acid → 1-amino-3-methoxybenzene). | do | violet. |
| 38 | 0.6 mol of (1-hydroxy-2-amino-6-chlorobenzene-4-sulfonic acid → 2-amino-5-hydroxynaphthalene-7-sulfonic acid). | 1.4 mols of (1-carboxy-2-aminobenzene-5-sulfonic acid → 1-(3′-amino)-phenyl-3-methyl-5-pyrazolone). | metal complex compound | brown. |
| 39 | 1 mol of (1-carboxy-2-aminobenzene-5-sulfonic acid → 2-amino-5-hydroxynaphthalene-7-sulfonic acid). | 1 mol of (1-amino-2-hydroxy-6-nitronaphthalene-4-sulfonic acid → 1-(4′-amino)-phenyl-3-methyl-5-pyrazolone). | do | red. |
| 40 | 0.8 mol of (2-amino-benzene-1-carboxylic acid → 2-amino-5-hydroxynaphthalene-7-sulfonic acid). | 1.2 mols of (1-carboxy-2-aminobenzene-4-sulfonic acid → 1-(4′-amino)-phenyl-3-methyl-5-pyrazolone). | do | yellow-brown. |
| 41 | 1 mol of (1-methoxy-2-amino-5-nitrobenzene → 1,8-dihydroxynaphthalene-3,6-disulfonic acid and reduction). | same as (AA) | do | reddish blue. |
| 42 | 1 mol of (1-methoxy-2-amino-5-nitrobenzene → 1-hydroxynaphthalene-3,8-disulfonic acid and reduction). | same as (AA) | do | bluish violet. |
| 43 | do | 1 mol of (1-methoxy-2-amino-5-nitrobenzene → 2-hydroxynaphthalene-4-sulfonic acid and reduction). | do | reddish violet. |
| 44 | 1 mol of (1-methoxy-2-amino-5-nitrobenzene → 1,8-dihydroxynaphthalene-3,6-disulfonic acid and reduction). | do | do | violet. |
| 45 | 1 mol of (1-methoxy-2-amino-5-nitrobenzene → 2-hydroxynaphthalene-6,8-disulfonic acid and reduction). | do | do | bordeaux. |
| 46 | 2 mols | | do | reddish yellow. |

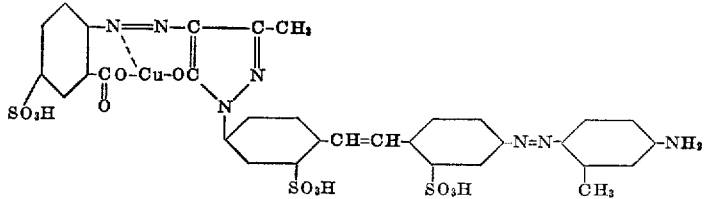

| | | | | |
|---|---|---|---|---|
| 47 | 0.4 mol of copper complex compound of (1-carboxy-2-aminobenzene-5-sulfonic acid → 1-(4′-amino)-phenyl-3-methyl-5-pyrazolone). | 1.6 mols of (1-hydroxy-2-(4′-amino)-benzoylamino-6-carboxybenzene-4-sulfonic acid → 1-amino-3-methylbenzene). | aftercoppering dyestuff | yellow. |
| 48 | 1.8 mols of copper complex compound of (1-carboxy-2-aminobenzene-5-sulfonic acid → 1-(4′-amino)-phenyl-3-methyl-5-pyrazolone). | 0.2 mol of (1-hydroxy-2-(4′-amino)-benzoylamino-6-carboxybenzene-4-sulfonic acid → 1-amino-3-methylbenzene). | do | Do. |
| 49 | 1 mol of (1-carboxy-2-aminobenzene-5-sulfonic acid → 1-(4′-amino)-phenyl-3-methyl-5-pyrazolone). | 1 mol of 4-hydroxy-4′-amino-1,1′-azobenzene-3-carboxylic acid. | do | Do. |
| 50 | do | 1 mol of 3-carboxy-4-hydroxy-4′-amino-1,1′-azobenzene-5-sulfonic acid. | do | Do. |
| 51 | do | 1 mol of (1-hydroxy-2-aminobenzene-4-sulfonic acid amide → 1-(4′-amino)-phenyl-3-methyl-5-pyrazolone). | do | reddish yellow. |
| 52 | 0.9 mol of copper complex compound of (1-carboxy-2-aminobenzene-5-sulfonic acid → 1-amino-4-acetoacetylaminobenzene). | 1.1 mols of (1-hydroxy-2-(4′-amino)-benzoylamino-6-carboxybenzene-4-sulfonic acid → 1-amino-3-methylbenzene). | do | yellow. |
| 53 | 1.4 mols of copper complex compound of (1-carboxy-2-aminobenzene-5-sulfonic acid → 1-amino-4-acetoacetylaminobenzene). | 0.6 mol of (1-hydroxy-2-(4′-amino)-benzoylamino-6-carboxybenzene-4-sulfonic acid → 1-amino-3-methylbenzene). | do | Do. |
| 54 | 1 mol of (1-carboxy-2-aminobenzene-5-sulfonic acid amide → 1-(4′-amino)-phenyl-3-methyl-5-pyrazolone). | 1 mol of 3-carboxy-4-hydroxy-4′-amino-1,1′-azobenzene-5-sulfonic acid. | do | Do. |
| 55 | do | 1 mol of (1-hydroxy-2-aminobenzene-4-sulfonic acid → 1-(4′-amino)-phenyl-3-methyl-5-pyrazolone). | do | Do. |
| 56 | 1 mol of (1-hydroxy-2-amino-6-chlorobenzene-4-sulfonic acid → 1-(3′-amino)-phenyl-3-methyl-5-pyrazolone). | 1 mol of 4-hydroxy-4′-amino-1,1′-azobenzene-3-carboxylic acid. | do | Do. |
| 57 | do | 1 mol of (1-amino-4-nitrobenzene-2-carboxylic acid → 1-phenyl-3-methyl-5-pyrazolone-3′-sulfonic acid and reduction). | do | orange. |
| 58 | 1 mol of the copper complex compound of (1-amino-2-hydroxy-6-nitronaphthalene-4-sulfonic acid → 1-phenyl-3-methyl-5-pyrazolone-3′-sulfonic acid and reduction). | same as (AA) | do | red. |
| 59 | 1 mol of (1-amino-4-(4′-nitro)-benzoylaminobenzene-2-carboxylic acid → 1-hydroxynaphthalene-6,8-disulfonic acid and reduction). | same as (AA) | do | Do. |
| 60 | 1 mol of (1-amino-4-nitrobenzene-2-carboxylic acid → 2-hydroxynaphthalene-6-sulfonic acid and reduction). | same as (AA) | do | yellow. |
| 61 | 1 mol of (1-amino-2-hydroxynaphthalene-4-sulfonic acid → 2-amino-5-hydroxynaphthalene-7-sulfonic acid). | same as (AA) | metal complex compound | bluish violet. |

| (1) Example No. | (2) Connected together with the aid of 1 Mol of Fumaric Acid Dichloride | | (3) Used in Dyeing as— | (4) Shade of Coppered Dyeing on Cotton |
|---|---|---|---|---|
| | Aminoazo Compound (AA) | Aminoazo Compound (AB) | | |
| 62 | 1 mol of (1-hydroxy-2-amino-4-methylsulfonylbenzene ⟶ 2-amino-5-hydroxynaphthalene-7-sulfonic acid). | 1 mol of (1-hydroxy-2-amino-4-methylsulfonylbenzene ⟶ 2-(4'-amino)-benzoylamino-5-hydroxynaphthalene-7-sulfonic acid). | aftercoppering dyestuff | bordeaux-red. |
| 63 | 1 mol of (1-hydroxy-2-amino-6-chlorobenzene-4-sulfonic acid ⟶ 1-amino-4-acetoacetylaminobenzene). | same as (AA) | do | yellow. |
| 64 | do | 1 mol of (1-amino-2-hydroxy-6-nitronaphthalene-4-sulfonic acid ⟶ 1-amino-4-acetoacetylaminobenzene). | do | reddish yellow. |
| 65 | 1 mol of (1-hydroxy-2-aminobenzene-4-sulfonic acid ⟶ 1-amino-4-acetoacetylaminobenzene). | do | do | Do. |
| 66 | do | same as (AA) | do | yellow. |
| 67 | 1 mol of (1-hydroxy-2-amino-6-nitrobenzene-4-sulfonic acid ⟶ 1-amino-4-acetoacetylaminobenzene). | same as (AA) | do | orange. |
| 68 | do | 1 mol of (1-amino-2-hydroxy-6-nitronaphthalene-4-sulfonic acid ⟶ 1-amino-4-acetoacetylaminobenzene). | do | Do. |
| 69 | 1 mol of (1-amino-2-hydroxy-6-nitronaphthalene-4-sulfonic acid ⟶ 1-amino-4-acetoacetylaminobenzene). | same as (AA) | do | Do. |
| 70 | do | 1 mol of (1-carboxy-2-aminobenzene-5-sulfonic acid ⟶ 1-amino-4-acetoacetylaminobenzene). | do | reddish yellow. |
| 71 | 1 mol of (1-carboxy-2-aminobenzene-5-sulfonic acid ⟶ 1-amino-4-acetoacetylaminobenzene). | same as (AA) | do | greenish yellow. |
| 72 | do | 1 mol of (1-hydroxy-2-aminobenzene-4-sulfonic acid ⟶ 1-amino-4-acetoacetyl-amino-benzene). | metal complex compound | yellow. |
| 73 | do | 1 mol of (1-hydroxy-2-amino-6-nitrobenzene-4-sulfonic acid ⟶ 1-amino-4-acetoacetyl-aminobenzene). | do | yellow-brown. |
| 74 | 1 mol of (1-amino-2-hydroxy-6-nitronaphthalene-4-sulfonic acid ⟶ 1-amino-3-methoxy-4-acetoacetyl-aminobenzene). | same as (AA) | aftercoppering dystuff | orange. |
| 75 | do | 1 mol of (1-hydroxy-2-amino-6-chlorobenzene-4-sulfonic acid ⟶ 1-amino-3-methoxy-4-acetoacetylaminobenzene). | do | reddish yellow. |
| 76 | 1 mol of (1-hydroxy-2-aminobenzene-4-sulfonic acid ⟶ 1-amino-3-methoxy-4-acetoacetyl-aminobenzene). | same as (AA) | do | yellow. |
| 77 | 1 mol of (1-carboxy-2-aminobenzene-5-sulfonic acid ⟶ 1-amino-3-methoxy-4-acetoacetylaminobenzene). | same as (AA) | do | greenish yellow. |
| 78 | 1 mol of (1-hydroxy-2-(3'-hydroxy-4'-amino)-benzoylamino-6-carboxy-benzene-4-sulfonic acid ⟶ 1-amino-3-methoxy-4-acetoacetylaminobenzene). | same as (AA) | do | yellow. |
| 79 | 1 mol of (1-hydroxy-2-amino-6-carboxybenzene-4-sulfonic acid ⟶ 1-amino-3-chloro-4-acetoacetylaminobenzene). | same as (AA) | do | Do. |
| 80 | 1 mol of (1-amino-2-hydroxy-6-nitronaphthalene-4-sulfonic acid ⟶ 1-amino-3-chloro-4-acetoacetylaminobenzene). | same as (AA) | do | orange. |
| 81 | 1 mol of (1-carboxy-2-aminobenzene-5-sulfonic acid amide ⟶ 1-amino-3-chloro-4-acetoacetylamino-benzene). | same as (AA) | do | greenish yellow. |
| 82 | 1 mol of (1-carboxy-2-aminobenzene-5-sulfonic acid-(2'-carboxy)-phenylamide ⟶ 1-amino-3-chloro-4-acetoacetylamino-benzene). | same as (AA) | do | Do. |
| 83 | 1 mol of (1-hydroxy-2-amino-6-chlorobenzene-4-sulfonic acid ⟶ 1-amino-4-acetoacetylaminobenzene). | 1 mol of (1-hydroxy-2-aminobenzene-4-sulfonic acid ⟶ 1-amino-3-chloro-4-acetoacetylaminobenzene). | do | yellow. |
| 84 | 1 mol of (1-amino-2-hydroxy-6-nitronaphthalene-4-sulfonic acid ⟶ 1-amino-3-methoxy-4-acetoacetyl-aminobenzene). | 1 mol of (1-carboxy-2-aminobenzene-5-sulfonic acid ⟶ 1-amino-4-acetoacetylaminobenzene). | do | reddish yellow. |
| 85 | 1 mol of (1-hydroxy-2-aminobenzene-4-sulfonic acid ⟶ 1-amino-3-methoxy-4-acetoacetylaminobenzene). | 1 mol of (1-hydroxy-2-amino-6-carbethoxyaminobenzene-4-sulfonic acid ⟶ 1-amino-4-acetoacetylaminobenzene). | do | yellow. |
| 86 | 1 mol of (2-amino-5-carbethoxyaminobenzene-1-carboxylic acid ⟶ 1-amino-3-methoxy-4-acetoacetylaminobenzene). | 1 mol of (1-hydroxy-2-amino-6-chlorobenzene-4-sulfonic acid ⟶ 1-amino-4-acetoacetylaminobenzene). | do | Do. |
| 87 | 1 mol of (2-amino-5-acetylaminobenzene-1-carboxylic acid ⟶ 1-amino-3-chloro-4-acetoacetylaminobenzene). | 1 mol of (1-amino-2-hydroxy-6-nitronaphthalene-4-sulfonic acid ⟶ 1-amino-4-acetoacetylaminobenzene). | do | orange. |
| 88 | 1 mol of (1-hydroxy-2-amino-6-nitrobenzene-4-sulfonic acid ⟶ 1-amino-3-methoxy-4-acetoacetylaminobenzene). | 1 mol of (1-hydroxy-2-aminobenzene-5-sulfonic acid ⟶ 1-amino-3-chloro-4-acetoacetylaminobenzene). | do | reddish yellow. |
| 89 | 1 mol of (1-hydroxy-2-amino-6-carbethoxyaminobenzene-4-sulfonic acid ⟶ 1-amino-4-acetoacetylaminobenzene). | 1 mol of (1-hydroxy-2-amino-6-chlorobenzene-4-sulfonic acid ⟶ 1-amino-3-methoxy-4-acetoacetylaminobenzene). | do | yellow. |
| 90 | 1 mol of (2-amino-5-nitrobenzene-1-carboxylic acid ⟶ 2-acetylamino-5-hydroxynaphthalene-7-sulfonic acid and reduction). | same as (AA) | do | red. |
| 91 | 1 mol of (2-amino-5-nitrobenzene-1-carboxylic acid ⟶ 2-carbo-(2'-ethoxy)-ethoxyamino-5-hydroxynaphthalene-7-sulfonic acid and reduction). | same as (AA) | do | Do. |
| 92 | 1 mol of (2-amino-5-nitrobenzene-1-carboxylic acid ⟶ 2-hydroxyacetylamino-5-hydroxynaphthalene-7-sulfonic acid and reduction). | same as (AA) | do | Do. |
| 93 | 1 mol of (1-hydroxy-2-amino-4-cyclohexylsulfonylbenzene ⟶ 2-amino-5-hydroxynaphthalene-7-sulfonic acid). | 1 mol of (1-hydroxy-2-amino-4-ethylsulfonylbenzene ⟶ 2-amino-5-hydroxynaphthalene-7-sulfonic acid). | do | bordeaux-red. |

Example 94

18.2 parts of the ammonium salt of 2-amino-5-nitrobenzene-1-carboxylic acid are stirred into 250 parts of water and, after an addition of 35 parts of hydrochloric acid 30%, are diazotized with 7.6 parts of sodium nitrite in 20 to 25 minutes at 45–50°. The surplus nitrous acid is eliminated by a small addition of amidosulfonic acid, whereupon the clear diazo solution is cooled to 0–5° and run in the course of 1 hour into an ice-cold, weakly acetic acid solution of 45 parts of 2-carbethoxyamino-5-hydroxynaphthalene-1,7-sodium disulfonate and 30 parts of sodium acetate crystals in 400 parts of water. Coupling is carried out over a period of 3 hours by gradually neutralizing the mass with the necessary quantity of sodium bicarbonate. The mass is then heated to 40° and the completely separated monoazo compound filtered off. For converting the nitro group into the amino group, the monoazo compound is dissolved in 5000 parts of water. Then the whole of 9 parts of sodium hydrosulfide in 50 parts of water is run into the solution. After 15–20 minutes' agitation, the resulting aminomonoazo compound is precipitated from the solution by an addition of salt and filtered off. The aminomonoazo compound, produced as a trisodium salt, is dissolved in 1600 parts of water at 5–12°. Under vigorous agitation, a 20% solution of fumaric acid dichloride in chlorobenzene is added dropwise until free $NH_2$ is no longer detectable. The disazo dyestuff so formed is separated from the condensing solution by means of salt, then filtered off and dried. It dissolves with Bordeaux-red coloration in water and in concentrated sulfuric acid and dyes cotton and fibers of regenerated cellulose in Bordeaux-red shades which possess excellent fastness to light, washing and perspiration when treated with a copper-yielding agent.

To convert the disazo dyestuff into the nickel complex compound, 66 parts of its hexasodium salt and 30 parts of crystalline sodium acetate are dissolved in 2500 parts of water at 90°. Then 141 parts of a 20% aqueous solution of crystalline nickel sulfate are added in the course of 1½ hours to the dyestuff solution. The temperature of the nickeling solution is maintained at 90° for a further 30 minutes. When the nickel complex compound thus formed is separated out, filtered off and dried, a dark-red powder is obtained which dissolves with Bordeaux-red coloration in water and in concentrated sulfuric acid. It corresponds to the formula

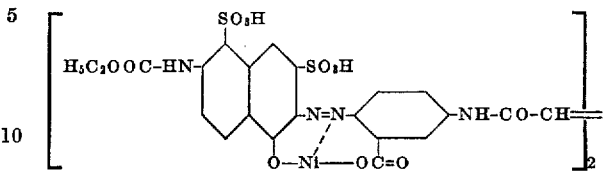

and dyes cotton and fibers of regenerated cellulose in Bordeaux-red shades which are fast to light, washing and perspiration.

By replacing the 141 parts of the 20% aqueous solution of crystalline nickel sulfate of the foregoing paragraph by a mixture of 62.5 parts of a 20% aqueous solution of crystalline nickel sulfate and 70.5 parts of a 20% aqueous solution of crystalline nickel sulfate, otherwise proceeding according to the foregoing paragraph, a mixed metal complex compound is obtained which dyes cotton and fibers of regenerated cellulose in Bordeaux-red shades having excellent fastness properties. Its asymmetrical substituent corresponds to the formula

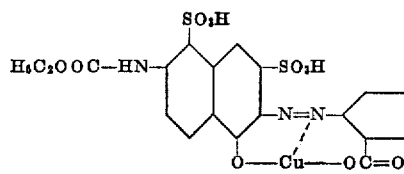 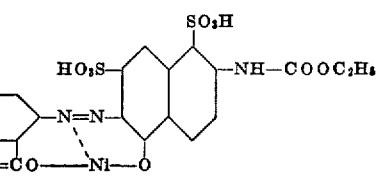

The dyestuff according to Example 43 is a mixture of three condensation products which correspond, in the form of their nickel complex compounds, to the formulae

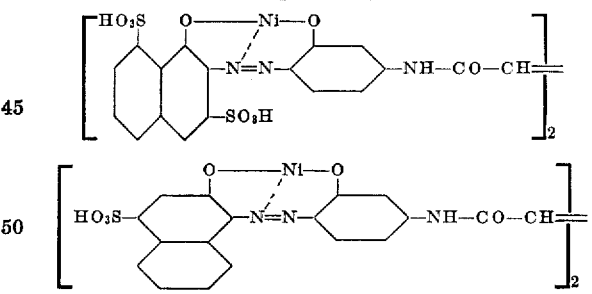

and

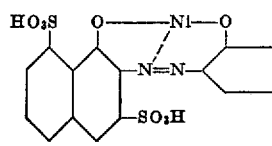 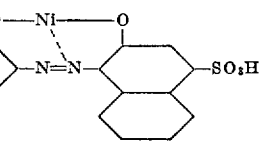

while the dyestuff according to Example 46 corresponds, in form of its copper complex compound, to the formula

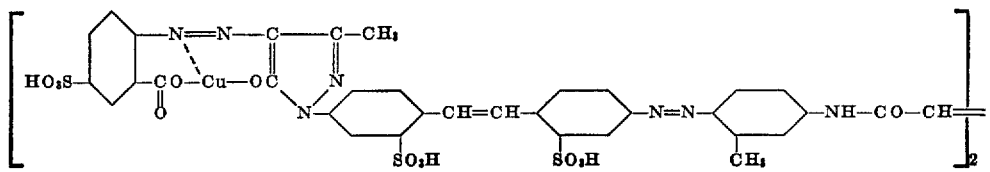

31

The dyestuff according to Example 62 is a mixture of the condensation products which correspond to the formulae

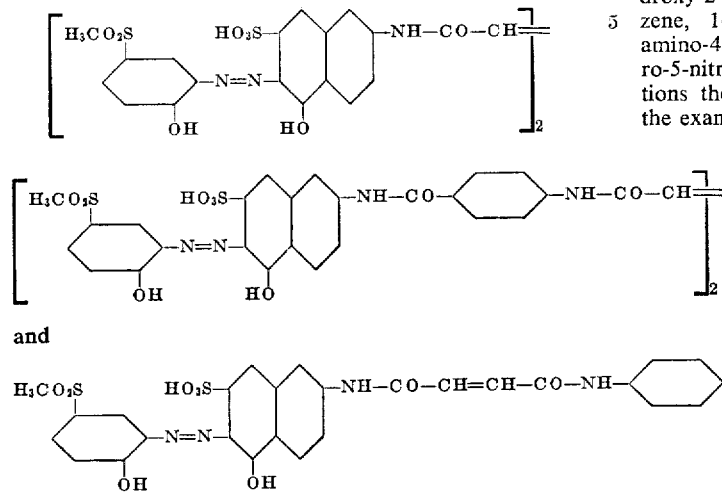

and

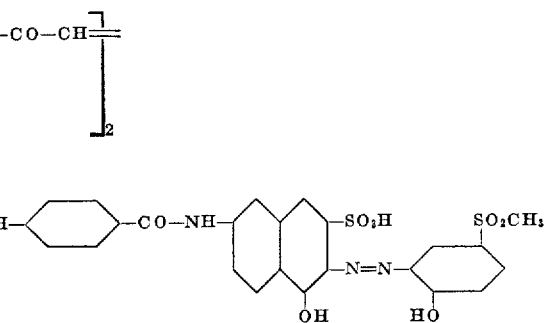

Example 95

10 parts of cotton are entered into a dye-bath containing 300 parts of lime-free water at 50°. Then a concentrated aqueous solution of 0.1 part of, for instance, the dyestuff of Example 17 is added to the bath, and the latter is heated to boiling in the course of 30 minutes, after which it is kept at boiling temperature for 15 minutes. In the course of the dyeing process, 3–4 parts of sodium sulfate are added in the form of a concentrated aqueous solution. After the dyeing process is over, the dyed material is allowed to cool to 50° in the bath in the course of 15 to 20 minutes, and is then rinsed and subjected to an aftertreatment with copper sulfate or a preferably basic, cation-active copper complex compound.

Dyeing may be carried out in like manner with the dyestuffs of the other examples. The products which are metallized in substance can also be used for dyeing in this manner, and even here an aftertreatment with a copper salt, especially with a cation-active compound, will in many cases improve the properties of the dyeing.

Example 96

15.4 parts of 1-hydroxy-2-amino-4-nitrobenzene are diazotized. The diazo solution is gradually added to a solution of 55.8 parts of symmetrical fumaric acid-di-[5-hydroxy-7-sulfonaphthyl-(2)]-amide in 1300 parts of water, 25 parts of 25% aqueous ammonia and 50 parts of 20% aqueous sodium carbonate solution. After stirring the mass at room temperature (about 20–25°) the coupling is completed. The resultant monoazo dyestuff will have separated out in crystalline form. The reaction mixture is then diluted with 2000 parts of water, 60 parts of 30% aqueous sodium hydroxide solution and 400 parts of pyridine are added, and the mixture heated to 30°, whereupon the dyestuff goes into solution. The solution is then cooled to 15–20° by adding ice, after which 20 parts of diazotized 1-hydroxy-2-amino-4-methylsulfonylbenzene are gradually added. The coupling to the disazo dyestuff takes place quickly. After stirring for 2 hours, the dyestuff solution is heated to 50° and 300 parts of sodium chloride are added. Upon cooling the solution, the disazo dyestuff separates out in crystalline form. It is filtered off and dried at 90° under reduced pressure. It dyes cotton and fibers of regenerated cellulose by the after-coppering process in Bordeau-red shades of very good fastness to light and good fastness to washing.

Dyestuffs with similar properties are obtained when, in the present example, the 1-hydroxy-2-amino-4-nitrobenzene is replaced by 1-hydroxy-2-amino-4-methylsulfonylbenzene, 1-hydroxy-2-amino-4-ethylsulfonylbenzene, 1-hydroxy-2-aminobenzene-4-sulfonic acid-methylamide, 1-hydroxy-2-aminobenzene, 1-hydroxy-2-amino-5-nitrobenzene, 1-hydroxy-2-amino-4-chlorobenzene, 1-hydroxy-2-amino-4,6-dichlorobenzene or 1-hydroxy-2-amino-4-chloro-5-nitrobenzene, or if in any of the aforesaid combinations the 1-hydroxy-2-amino-4-methylsulfonylbenzene of the example is replaced by 1-hydroxy-2-amino-4-ethylsulfonylbenzene or 1-hydroxy-2-aminobenzene-4-sulfonic acid methylamide.

This is a continuation-in-part of application Ser. No. 328,526, filed December 29, 1952.

Having thus disclosed the invention, what is claimed is:

1. A member selected from the class consisting of azo dyestuffs which correspond to the formula

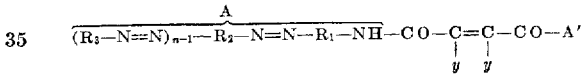

and the copper and nickel complex compounds thereof, wherein R₁ stands for a radical selected from the group consisting of a mononuclear radical of the benzene series, a binuclear radical of the benzene series and a radical of the naphthalene series, the two nuclei of said binuclear radical of the benzene series being connected together by a linkage selected from the group consisting of the simple carbon linkage, and an —NH—, —NH.CO—, —CO.NH— and —NH.CO.NH— bridge; each of R₂ and R₃ stands for a radical selected from the group consisting of a mononuclear radical of the benzene series, a binuclear radical of the benzene series and a radical of the naphthalene series, the two nuclei of said binuclear radical of the benzene series being connected together by a linkage selected from the group consisting of the simple linkage, and a —CH=CH—, —NH—, —NH.CO—, —CO.NH— and —NH.CO.NH— bridge; the radicals R₁, R₂ and R₃ being connected with the respective —N=N— groups by a linkage selected from the group consisting of a simple linkage and a pyrazolone and an acetoacetylamino moiety; one y stands for a member selected from the group consisting of hydrogen, chlorine, bromine and methyl, and the other y is hydrogen; n is one of the integers 1 and 2; wherein the radical A contains at least once the metallizable group of formula

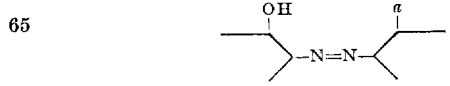

a being a member selected from the group consisting of

—OH, —COOH, —OCH₃, —OC₂H₅ and —OCH₂.COOH;

wherein A' stands for a radical selected from the group consisting of the radical A, a radical of an aminomonoazo dyestuff, a radical of an aminodiazo dyestuff containing an end-positioned ortho-hydroxy-carboxylic acid grouping, and a radical of an aminodisazo dyestuff different from A and containing at least once the aforesaid metallizable group of formula

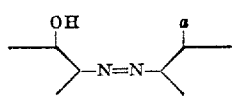

and wherein the radicals A and A' contain a total of 2 to 6 water-solubilizing groups.

2. An azo dyestuff according to claim 1, wherein the

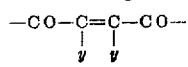

grouping is the fumaryl grouping.

3. An azo dyestuff consisting essentially of a mixture of condensation products corresponding to the formulae

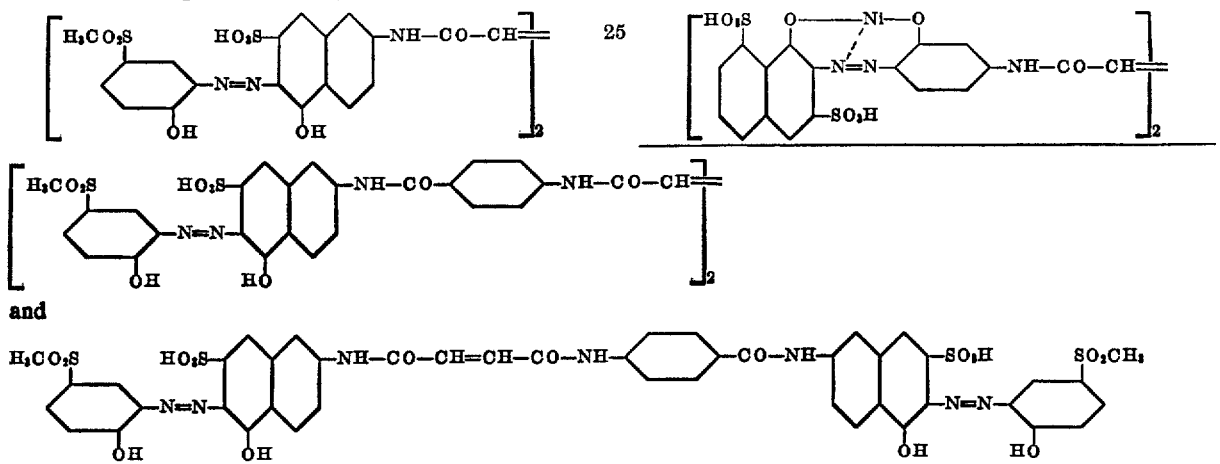

and

4. An azo dyestuff which corresponds to the formula

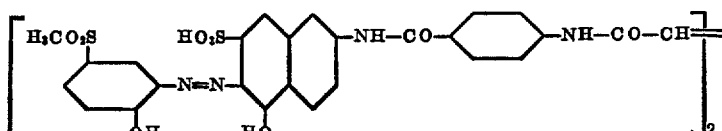

5. An azo dyestuff consisting essentially of a mixture of condensation products corresponding to the formulae

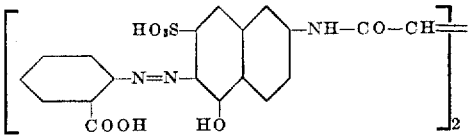

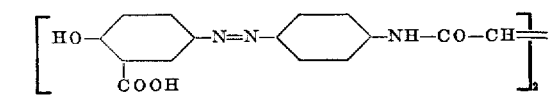

and

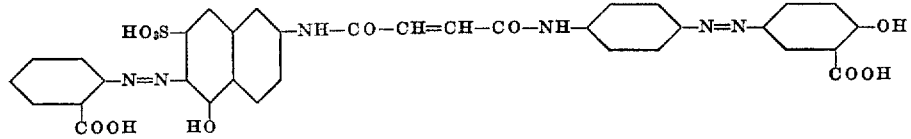

6. An azo dyestuff consisting essentially of a mixture of condensation products corresponding to the formulae

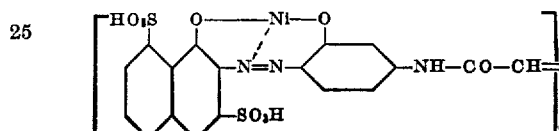

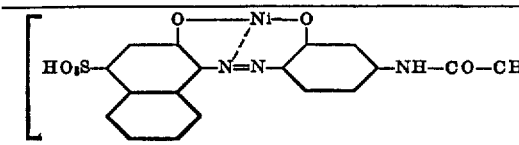

and

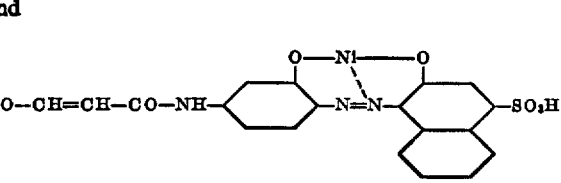

7. An azo dyestuff which corresponds to the formula

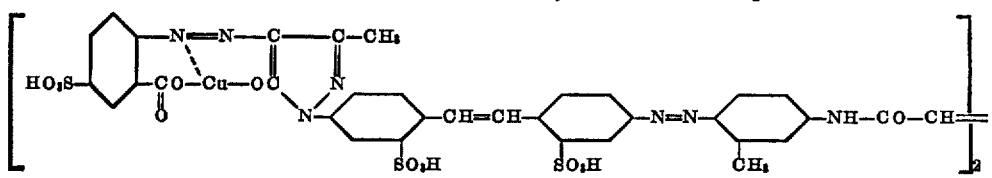

References Cited in the file of this patent

UNITED STATES PATENTS

| | | |
|---|---|---|
| 2,646,338 | Kappeler | July 21, 1953 |
| 2,673,198 | Grandjean et al. | Mar. 23, 1954 |

FOREIGN PATENTS

| | | |
|---|---|---|
| 504,489 | Belgium | July 31, 1951 |

U. S. DEPARTMENT OF COMMERCE
PATENT OFFICE

CERTIFICATE OF CORRECTION

Patent No. 2,813,852                                      November 19, 1957

Philippe Grandjean et al.

It is hereby certified that error appears in the printed specification of the above numbered patent requiring correction and that the said Letters Patent should read as corrected below.

Column 1, line 46, for "amnioazo" read -- amincazo --; column 4, line 4, for "signaficance" read -- significance --; column 5, line 33, for "amonia" read -- ammonia --; line 61, for "dystuffs" read -- dyestuffs --; column 7, line 19, for "regenreated" read -- regenerated --; column 11, line 65, for "detactable" read -- detectable --; column 14, line 72, after "droxy" insert a hyphen; column 16, line 21, for "couper" read -- copper --; line 55, for "dystuff" read -- dyestuff --; column 17, line 34, for "dies" read -- dyes --; column 23, line 57, for "fumeric" read -- fumaric --; column 24, line 62, for "process" read -- properties --; column 32, line 31, after "claimed is" strike out the period and insert instead a colon.

Signed and sealed this 8th day of April 1958.

(SEAL)
Attest:

KARL H. AXLINE

Attesting Officer

ROBERT C. WATSON
                                                                 Commissioner of Patents